US011952254B1

(12) United States Patent
Grimes et al.

(10) Patent No.: US 11,952,254 B1
(45) Date of Patent: Apr. 9, 2024

(54) FILLING STATION

(71) Applicant: MACHAN INVESTMENTS, LLC, Gardena, CA (US)

(72) Inventors: James E. Grimes, Yorba Linda, CA (US); Sun Guanyue, Shanghai (CN); Dinesh Weerasekera, Gardena, CA (US); Shehan R. James, Los Angeles, CA (US); Anuradha A. De Silva, Gardena, CA (US)

(73) Assignee: MACHAN INVESTMENTS, LLC, Gardena, CA (US)

( * ) Notice: Subject to any disclaimer, the term of this patent is extended or adjusted under 35 U.S.C. 154(b) by 0 days.

(21) Appl. No.: 18/504,525

(22) Filed: Nov. 8, 2023

Related U.S. Application Data

(60) Provisional application No. 63/382,934, filed on Nov. 9, 2022.

(51) Int. Cl.

| | |
|---|---|
| ***B67C 3/28*** | (2006.01) |
| ***B67C 3/02*** | (2006.01) |
| ***B67C 3/24*** | (2006.01) |
| ***B67C 3/26*** | (2006.01) |

(52) U.S. Cl.
CPC ................ *B67C 3/287* (2013.01); *B67C 3/02* (2013.01); *B67C 3/24* (2013.01); *B67C 3/26* (2013.01)

(58) Field of Classification Search
CPC .... B67C 3/02; B67C 3/24; B67C 3/26; B67C 3/28; B67C 3/287
See application file for complete search history.

(56) References Cited

U.S. PATENT DOCUMENTS

| | | | | |
|---|---|---|---|---|
| 5,067,531 | A * | 11/1991 | Herzog | B65B 3/32 417/403 |
| 8,156,972 | B2 * | 4/2012 | Burns | F25J 1/00 141/207 |
| 8,561,656 | B2 * | 10/2013 | Eginton | F04B 43/12 222/255 |
| 9,908,765 | B2 * | 3/2018 | Levenstein | G09F 15/0075 |
| 11,518,553 | B2 * | 12/2022 | Kleinheinz | F04B 13/00 |
| 11,745,991 | B2 * | 9/2023 | Garcia Tebar | B67C 7/00 141/89 |
| 11,753,289 | B2 * | 9/2023 | Tansey, Jr. | F17C 5/02 141/6 |
| 2003/0051767 | A1 * | 3/2003 | Coccaro | B67D 7/348 141/351 |

(Continued)

*Primary Examiner* — Nicolas A Arnett
(74) *Attorney, Agent, or Firm* — Charles L. Thoeming

(57) ABSTRACT

Hotel amenity fluid dispensing assemblies, systems, and methods for refilling empty reuseable jars from a source container positioned on separate scales within a housing. Each container/jar provides an RFID tag identity read by its respective scale RFID reader to provide selective operational parameters. Separate housing tower assemblies are fluidly connected to the central pumping assembly between the tower assemblies to draw product from the source container to the fill jar. Microprocessor-based control is electrically coupled to the pumping assembly, the scales, and RFID readers to turn fluid flow on and off. The control actuates the pumping assembly to dispense a precise amount of the fluid based upon the RFID identity and real time scale readings and activates tower assembly manifold movement to allow for replacement of empty source and full fill jars.

13 Claims, 24 Drawing Sheets

(56) References Cited

U.S. PATENT DOCUMENTS

| | | | | |
|---|---|---|---|---|
| 2014/0110018 | A1* | 4/2014 | Scarvelli | B67D 1/0891 141/64 |
| 2014/0230960 | A1* | 8/2014 | Ciavarella | B65B 3/045 141/237 |
| 2016/0200463 | A1* | 7/2016 | Hodges | G07F 13/06 53/136.3 |
| 2019/0139355 | A1* | 5/2019 | Kong | B67D 7/22 |
| 2022/0374030 | A1* | 11/2022 | Lehtonen | B01F 33/846 |
| 2022/0379697 | A1* | 12/2022 | Lopez | B60J 7/141 |
| 2022/0415115 | A1* | 12/2022 | Tansey, Jr. | G07F 13/04 |

* cited by examiner

FILLING STATION

CROSS-REFERENCES TO RELATED APPLICATIONS

This application claims the priority benefit of U.S. Provisional Utility Application No. 63/382,934, filed Nov. 9, 2022, the entirety of which is incorporated herein by reference.

STATEMENT REGARDING FEDERALLY SPONSORED RESEARCH OR DEVELOPMENT

None.

REFERENCE TO A MICRO-FICHE APPENDIX

None.

NOTICE REGARDING COPYRIGHTED MATERIAL

A portion of this patent document contains material subject to copyright protection and/or copyright registration. The copyright owner has no objection to the facsimile reproduction by anyone of the patent document or the patent disclosure as it appears in the file or records maintained by the United States Patent and Trademark Office, any other international patent office, and/or any other national patent office(s), but the copyright owner otherwise reserves all copyright rights.

TECHNICAL FIELD

The filling station relates to an assembly for automatically dispensing a liquid from a supply reservoir to a smaller container. More particularly, the filling station relates to a desktop filling station and a liquid dispensing system and method for types of hotel amenity liquids including, without limitation, bath gel, body lotion, body wash, hair conditioner, hair lotion, shampoo-conditioners, shampoos, soaps, and fragrance in units determined by weight differential discharged from the supply reservoir to the smaller container.

BACKGROUND ART

Previous approaches to fluid dispensing assemblies involve various configurations and components to selectively refill a jar with fluid. These approaches aim to provide efficient and reliable systems for dispensing fluids in a controlled manner, however, they suffer from a common shortcoming. To refill a substantial number of reusable jars from a bulk container interrupting flow as each reusable jar is refilled requires constant vigilance by an operator to stop flow as another empty reusable jar is placed into refill position. When a bulk source container is empty, the operator often must manually remove the source container's fluid connectivity to the fill jar and operational efficiency is lost. Interchanging the fluid connectivity elements of the source container or fill jar can be time-consuming and renders them prone to becoming damaged, discarded, or lost. It would be advantageous to accurately fill and refill reusable jars and prevent damage to equipment.

Automation may reduce the time spent by the operator for these routine tasks and allow use of their time for other tasks.

Current fluid transfer devices and methods for liquid dispensing system and method for types of hotel amenity liquids suffer from various drawbacks, including prohibitive cost, low efficiency, intensive labor demands, and excessive fluid spill or leakage. Some aspects disclosed overcome one or more of these disadvantages.

Other fluid transfer devices and methods for liquid dispensing system and method for types of hotel amenity liquids require the operator to check whether the bulk source container product is intended for the reuseable fill jar. This shortcoming entails constant check and rechecking of the compatibility or identification between source container and reuseable fill jar. Large hotels often use differing products, varied product manufacturers, and multiple sized, reuseable fill jars, exacerbating the demand for attention and knowledge required for operators to conduct the refilling process efficiently and effectively.

None of the known approaches provide a comprehensive solution that combines the features described in this disclosure to overcome these several drawbacks.

SUMMARY OF THE INVENTION

In the fields of eco-conscious hotel amenities and sustainable bulk soap dispensers, desk top filling stations are used to dispense hotel amenities from a bulk liquid container to an eco-conscious reusable, smaller container for hotel bathroom suites. These filling stations receive attention particularly for applicability in dispensing a broad range of amenities with varying degrees of viscosity because the filling stations can perform repeated bulk transfers from the bulk liquid container into the smaller ensuite container, which are difficult for a person to manually perform using hand pumping or funnels. Because the dispensing is repeatedly performed to refill many smaller ensuite containers the filling station discharges a precise amount of liquid with high accuracy to effectively refill amenity liquids in ensuite containers. The nature of the fluids dispensed by the filling station are controlled and maintained by laminar fluid flow. Further, various kinds of system quality control analysis and inspections are based upon efficiently dispensing a precise volume to a wide range of ensuite containers. It is also desirable for one filling station to be adaptable to discharge a broad range of amenity liquids.

According to a first aspect of the filling station, there is provided a low shear disc pump controlled by the filling station microprocessor-based control, the pump centered in a fluidly connected passage for sucking a discharge liquid through a suction tube from a bulk source container in an amount corresponding to a discharge volume dispensed to a fill jar through fluid connectivity.

According to a second aspect of the filling station, the fluid flow from the bulk source container to the fill jar in the fluidly connected passage is laminar.

According to a third aspect of the filling station, fluid in the bulk source container is monitored in real time by the filling station scale below the bulk source container platform communicating with the filling station microprocessor-based control.

According to a fourth aspect of the filling station, fluid in the fill jar is monitored in real time by the filling station scale below the fill jug platform communicating with the filling station microprocessor-based control.

According to a fifth aspect of the filling station, the filling station microprocessor-based control records a bulk source container initialization by the scale below the bulk source container reading a passive RFID tag on the bulk source container.

According to a sixth aspect of the filling station, the filling station microprocessor-based control records a fill jar initialization by the scale below the fill jar reading a passive RFID tag on the fill jar.

According to a seventh aspect of the filling station, if the filling station microprocessor-based control determines the liquid in the bulk source container cannot refill the fill jar, the microprocessor-based control stops fluid flow, provides notification to the operator on the liquid crystal display (LCD) interactive touch screen, and details corrective action.

According to an eighth aspect of the filling station, the filling station microprocessor-based control stops the centrifugal pump and fluid flow when the bulk source container is nearly empty, or the fill jar is full.

According to a ninth aspect of the filling station, when the bulk source container liquid product is below a predetermined threshold weight the microprocessor-based control stops the pump and fluid flow, automatically raises the bulk source tower manifold assembly, and the LCD interactive touch screen provides notification to the operator to replace the bulk source container with a full bulk source container.

According to a tenth aspect of the filling station, when the fill jar is full the microprocessor-based control stops the pump and fluid flow, automatically raises the fill jar manifold assembly if necessary for removal of the full fill jar, and the LCD interactive touch screen provides notification to the operator to replace the full fill jar with an empty fill jar.

According to an eleventh aspect of the filling station, when the bulk source container or fill jar is replaced, the refill process is restarted by the microprocessor-based control once the microprocessor-based control receives matching active RFID reader identity for the bulk source container and fill jar, and real time weights for the build source container and the fill jar from the respective bulk source container and fill jar weigh stations.

According to a twelfth aspect of the filling station, the filling station microprocessor-based control stores and provides statistic features and/or metrics including, without limitation: 1) volume of bulk source container liquid dispensed over time; 2) volume of fill jar liquid filled over time; 3) system run time for desired intervals; 4) real time fluid flow rate, and 5) liquid product inventory and supply chain data over time by tracking passive RFID tags on the bulk source containers and fill jars, and volume of fluid exchange from the bulk source containers to fill jars over desired time intervals.

The filling station includes a housing with a chassis positioned on a horizontal support surface. The housing includes an internal case assembly, which may contain various components such as a pumping assembly, microprocessor-based control elements, and separate bulk source container and fill jar fluid control towers. The housing includes bulk source containers and fill jar scale weigh stations, which are supported by a bulk source container scale assembly and separate active RFID readers. The bulk source containers have an open top and are designed to discharge fluid. Using passive RFID tags on the bulk source containers and fill jars allows for easy identification, and fine-tuned fluid transfer from the bulk source container to the fill jar.

The filling station uses bulk source containers and fill jar tower assemblies supported by the housing to provide a structured framework for the fluid dispensing process. The bulk source container tower assembly includes an extruded aluminum central element with multiple channels, a top cap assembly, top and bottom manifold assemblies, and various tubes for fluid connectivity and flow. Similarly, the fill jar tower assembly includes an extruded aluminum central element with channels, a top cap assembly, top and bottom manifold assemblies, and tubes for fluid connectivity and flow. The tower assemblies are designed to facilitate the movement of fluid from the bulk source containers to the fill jars.

Microprocessor-based control elements within the internal case assembly are electronically coupled to various components such as the pumping assembly, mechanical assemblies for raising and lowering the tower assemblies, scale assemblies, active RFID readers, and the LCD assembly. The microprocessor-based control elements enable the automation and coordination of the fluid dispensing process. Data for the microprocessor-based control and operational metrics for the fluid dispensing system are stored in a memory module of the microprocessor-based control elements. The microprocessor-based control elements and memory module are accessible by wireless networking technology (Wi-Fi) and Universal Serial Bus (USB) connectivity.

MODE FOR CONDUCTING THE INVENTION

Figure 1:
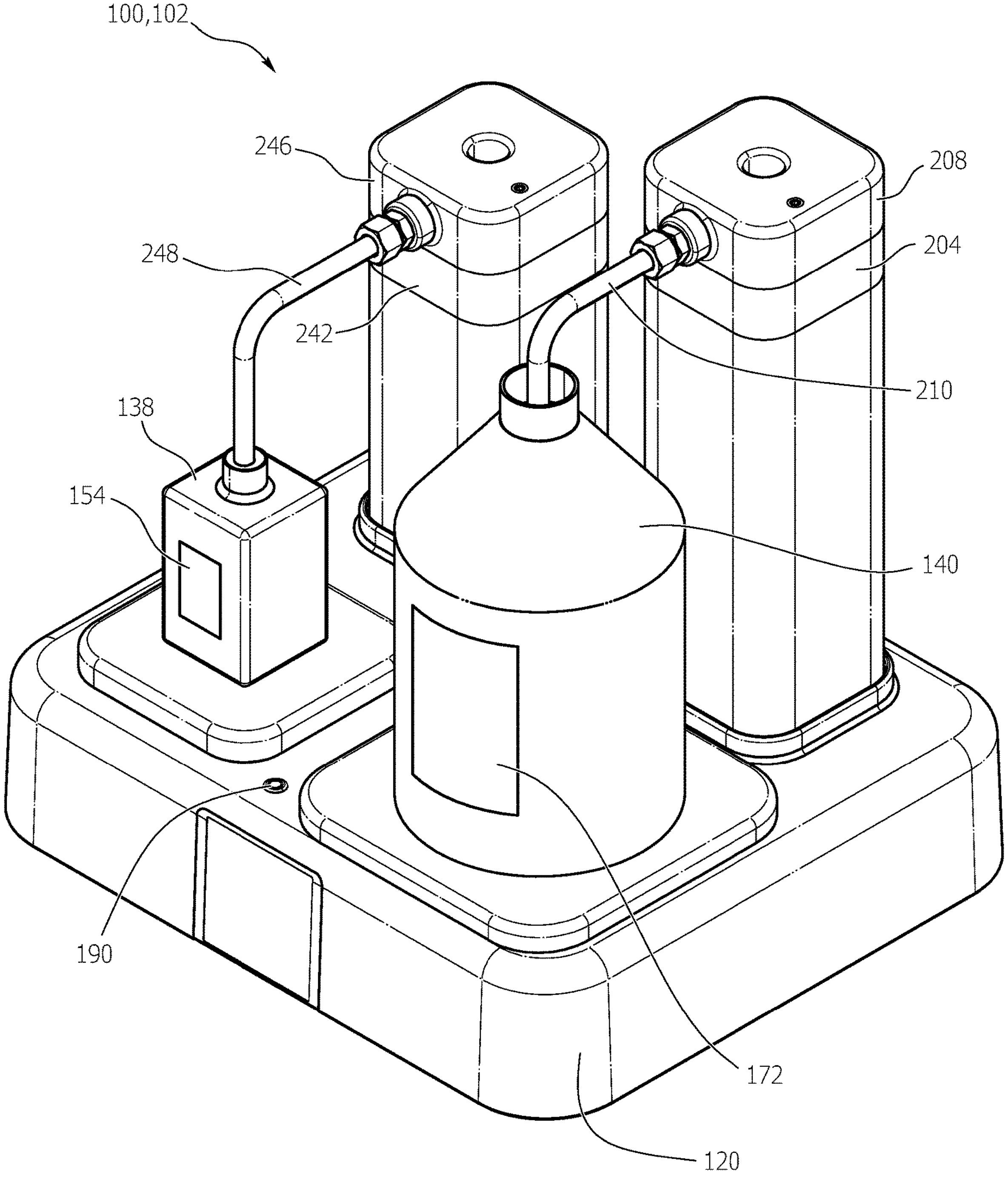
FIG. 1 depicts a top right perspective view of an aspect of the filling station apparatus 100 and the filling station system 102.

An aspect of the fluid dispensing assembly 100, system 102, and method 104 configured to selectively refill a jar includes a housing 120 having a case assembly 118 supported by a chassis 126 and configured to be positioned on a horizontal support surface, FIGS. 1-21B. For an aspect of the fluid dispensing assembly 100 the housing 120 is fabricated from three-dimensionally (3-D) printed or injection molded polycarbonates and the chassis 126 is fabricated from stainless steel.

Figure 4A:
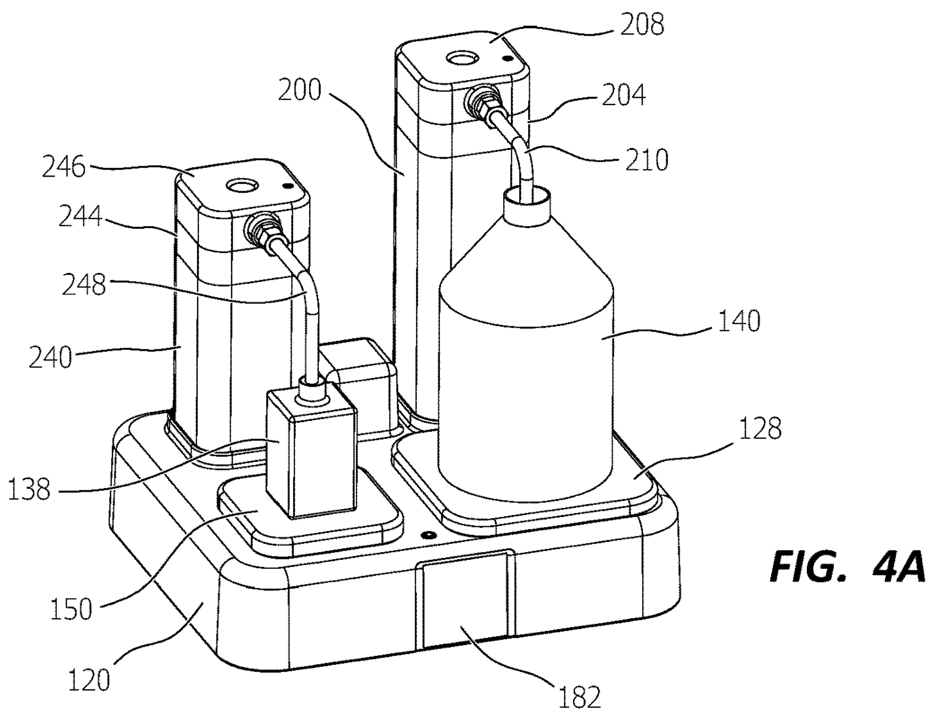
FIG. 4A depicts a top left perspective view of FIG. 1.

An aspect of the fluid dispensing assembly 100 includes a bulk source container 140 configured to be supported by the bulk source container scale assembly 128 on the housing 120 and to contain a fluid, FIG. 4A. The bulk source container 140 provides an open top and a passive radio frequency identification (RFID) tag 172, FIGS. 1, 2, and 4A. For an aspect of the fluid dispensing assembly 100 the full volume of the bulk source container is 4 liters.

An aspect of the fluid dispensing assembly 100 includes the bulk source container tower assembly 122 configured to be supported by the housing 120, FIGS. 5, 10-12. The bulk source container tower assembly 122 provides an extruded aluminum central element 200 having a longitudinal central axis 198, open top and bottom ends, and four equal sized channels 224 evenly spaced within and through the bulk source container extruded aluminum central element 200 around the longitudinal central axis 198, FIGS. 7, 11, 13, and 17. A bulk source container tower cap assembly 206 is sized to fit the source tower extruded aluminum central element 200 open top end, FIGS. 13, 18A, and 18B, and support tower assembly first and second tubes, 212 and 214 respectively as the bulk source tower top manifold assembly 208 is raised, FIGS. 4B, 18B. A bulk source container assembly bottom manifold assembly 222 is sized to fit and close the bulk source tower extruded aluminum central element 200 open bottom end within the housing 120. The bulk source container tower assembly bottom manifold assembly 222 is fluidly connected to any extruded aluminum central element 200 channel 224 housing a tube fluidly connected to the bulk source container tower top manifold assembly 208, FIGS. 13, 17, 18A and 18B.

Figure 7:
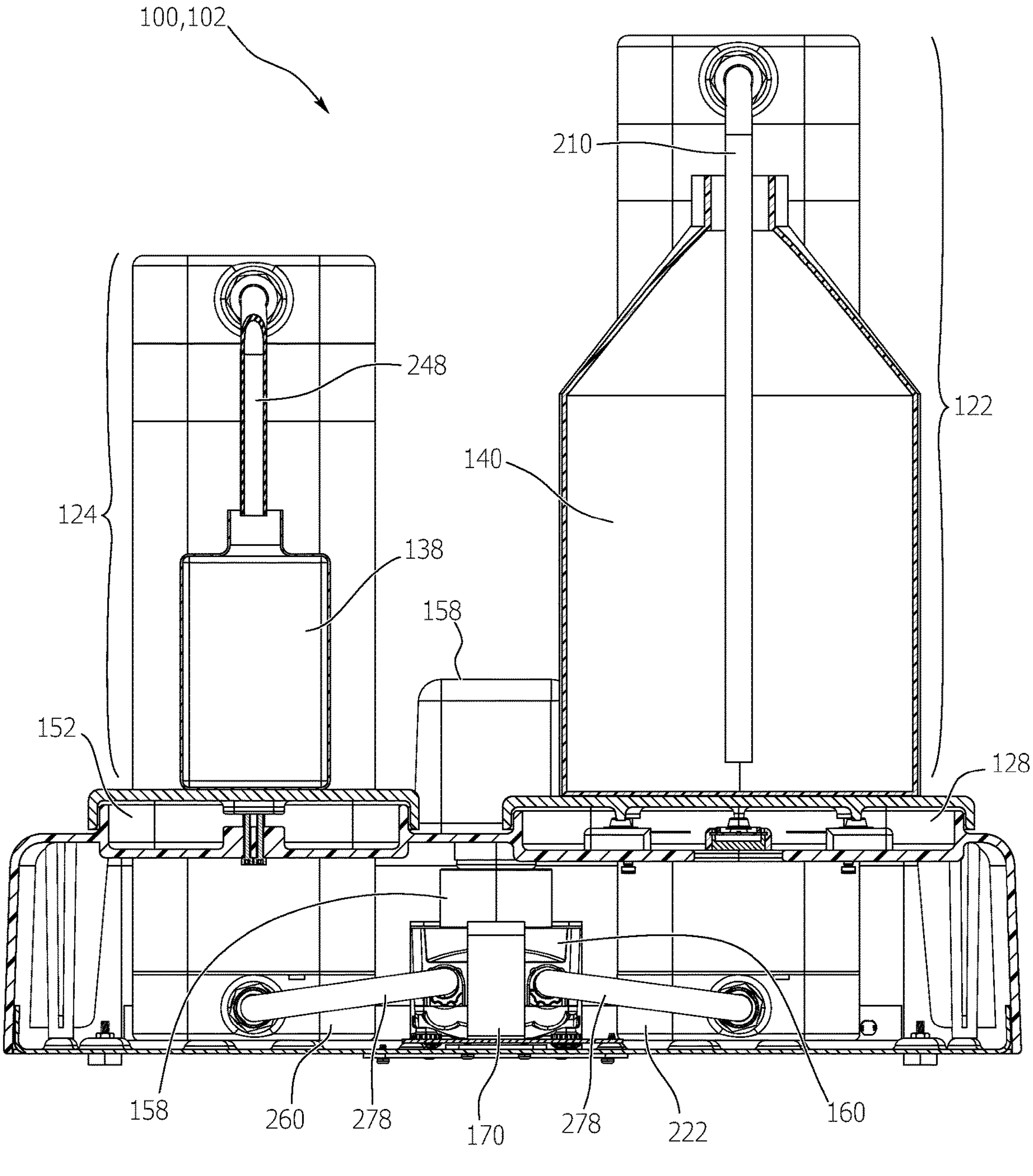
FIG. 7 depicts a cross-sectional view of FIG. 5 taken at "7-7."
Figure 8:
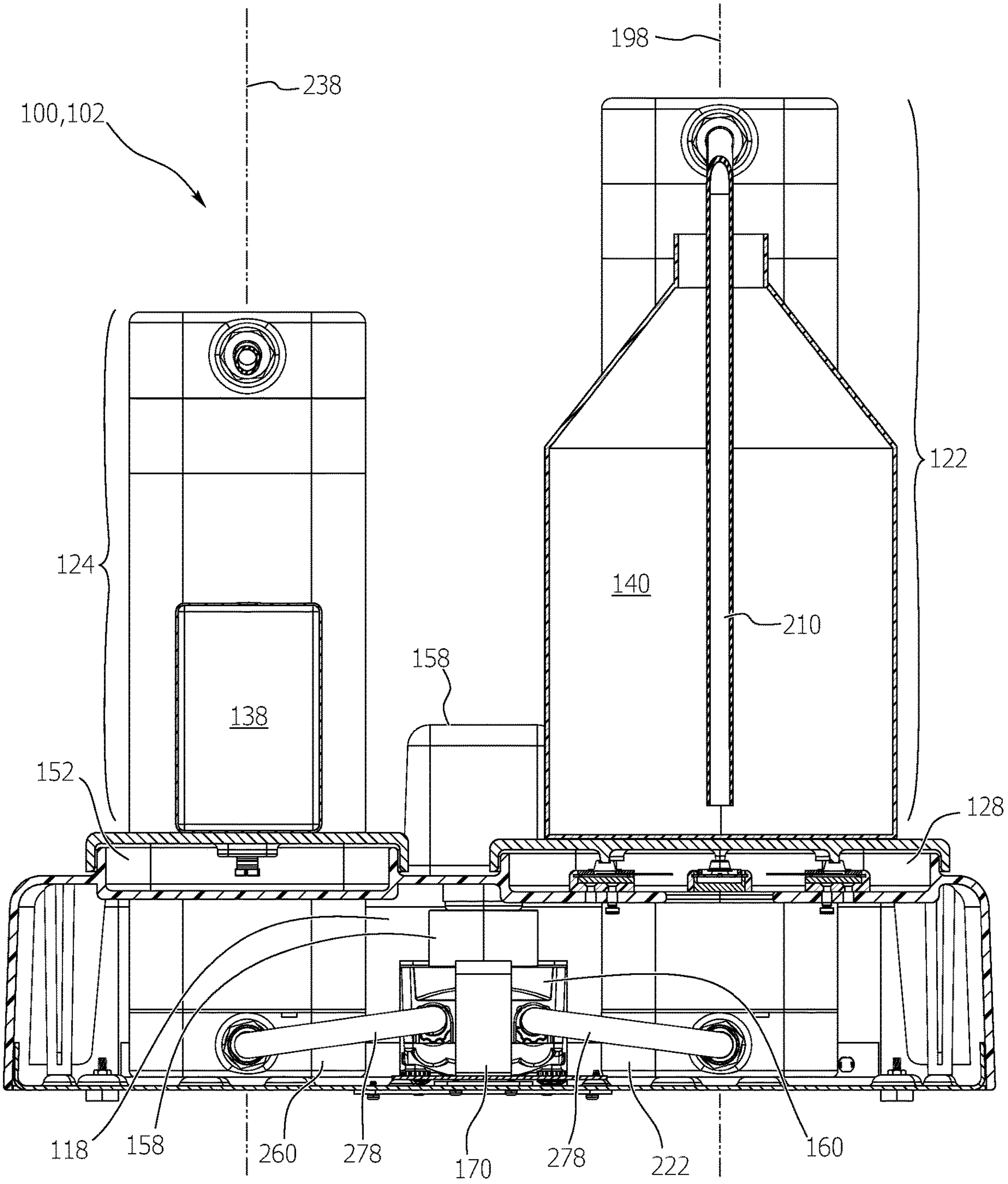
FIG. 8 depicts a cross-sectional view of FIG. 5 taken at "8-8."
Figure 18A:
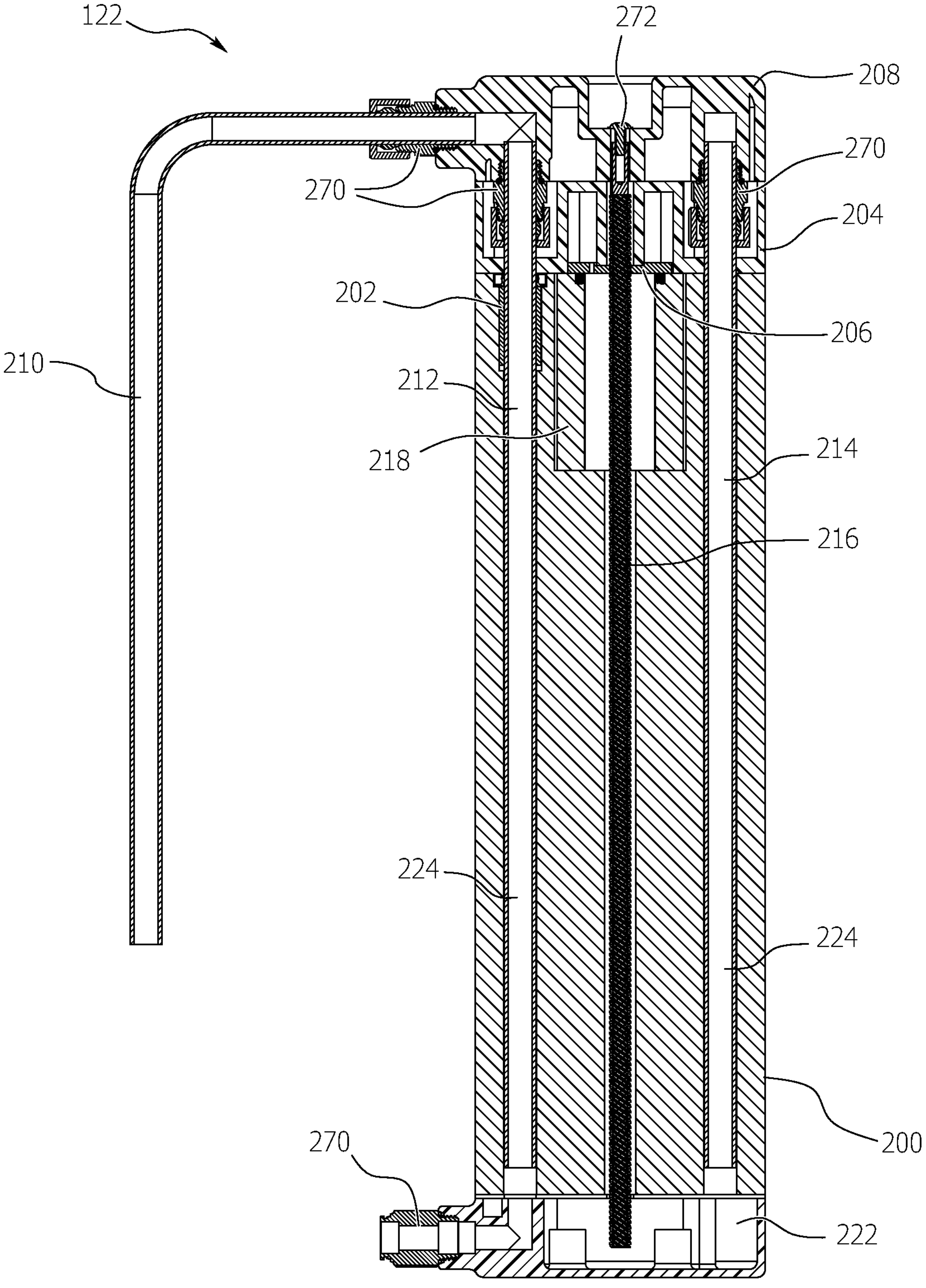
FIG. 18A depicts a cross-sectional view of FIG. 14 taken at "18A-18A.8
Figure 18B:
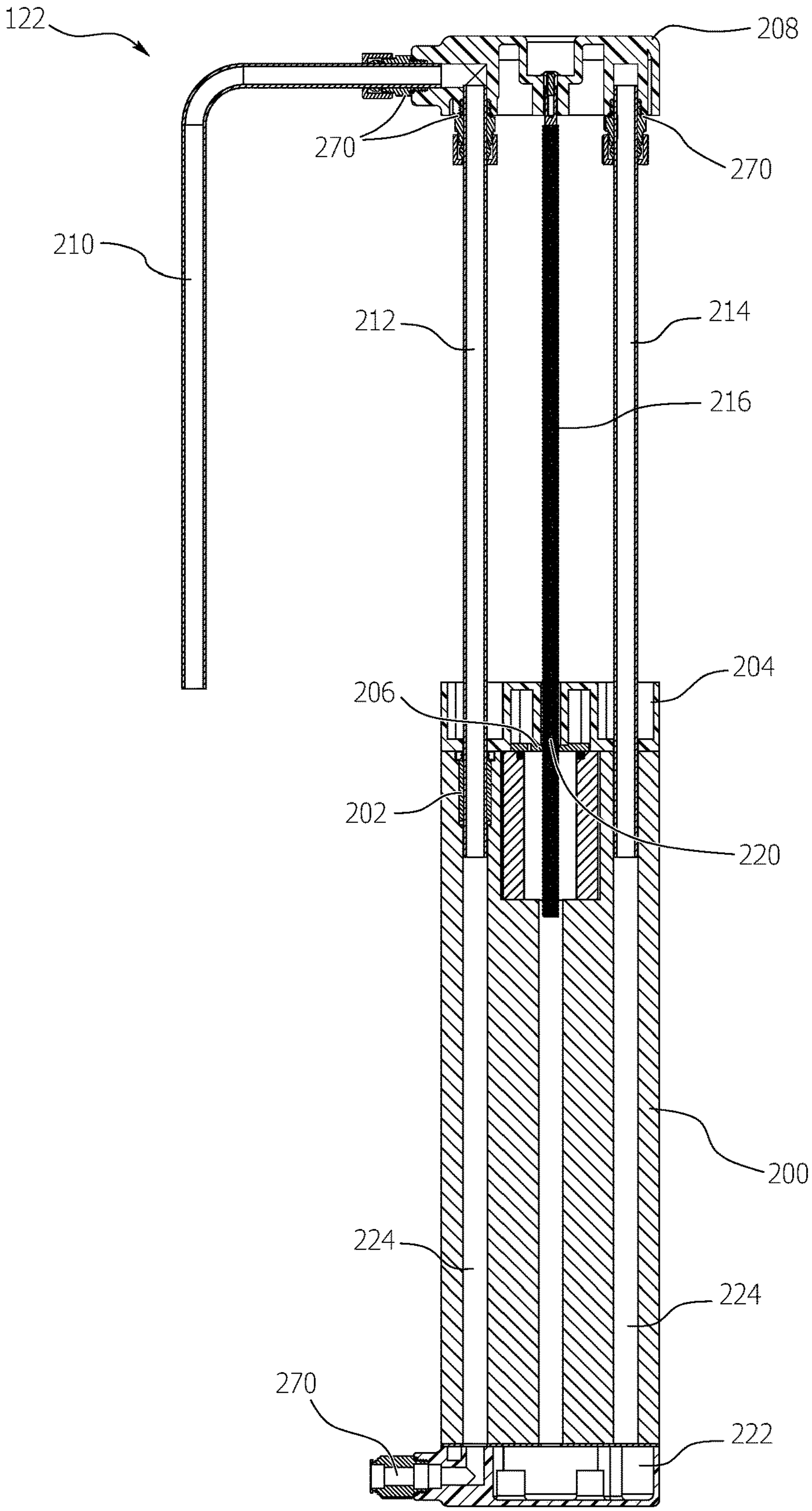
FIG. 18B depicts FIG. 18A with the with the bulk source container tower assembly top manifold 208 raised as depicted in FIG. 4B.
Figure 18C:
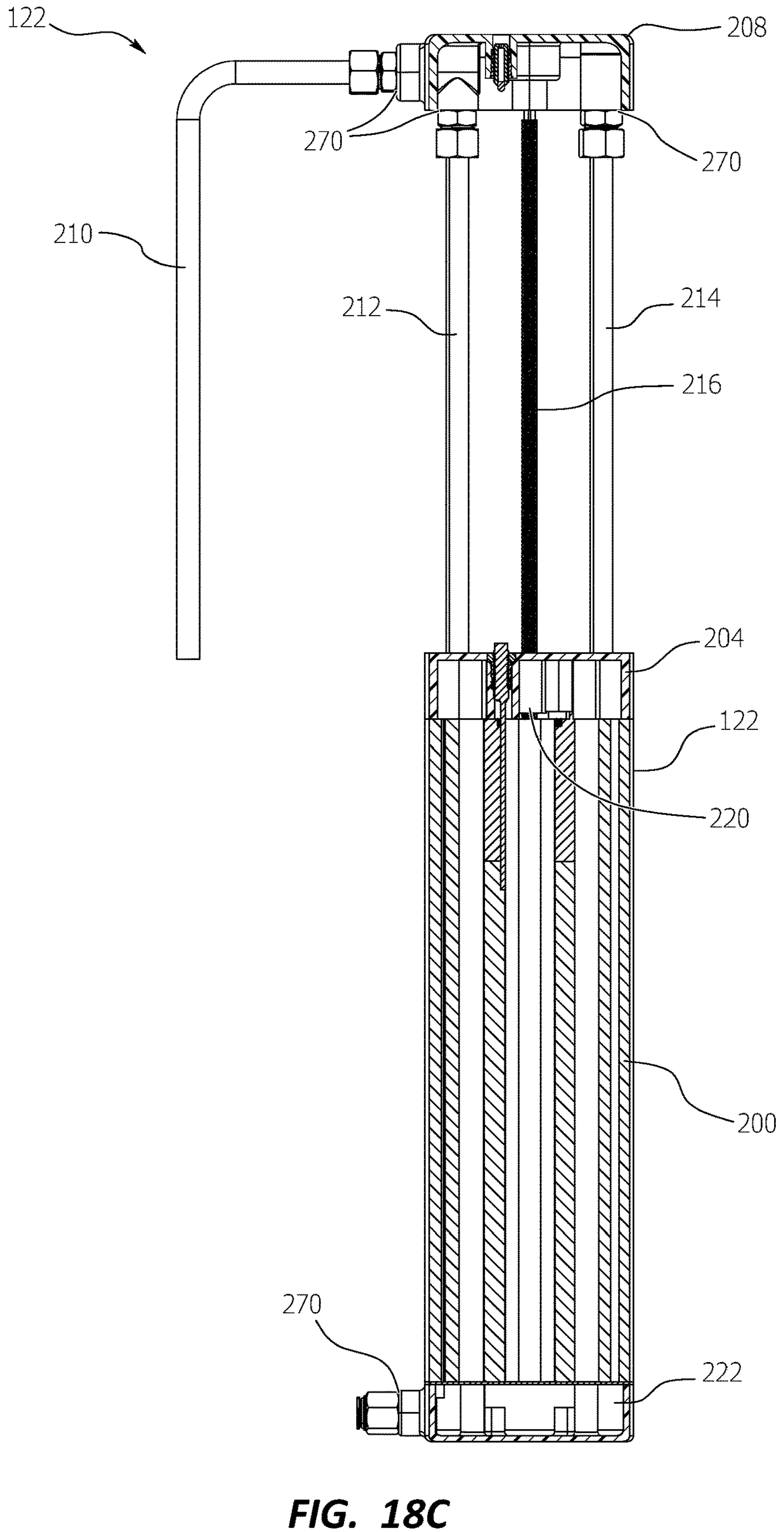
FIG. 18C depicts a cross-sectional view of FIG. 15 taken at "18C-18C" with the with the bulk source container tower assembly top manifold 208 raised as depicted in FIGS. 4B and 18B.

An external 90-degree bend tube 210 affixed to the bulk source tower top manifold assembly 208 and sized to fit within the bulk source container 122 opened top to a position above the bulk source container 122 internal bottom surface, FIGS. 7, 8, and 18B. An aspect of the fluid dispensing assembly 100 includes stainless steel 90-degree bend tube 210 having a 12 mm external diameter and a 9 mm internal diameter.

Figure 4B:
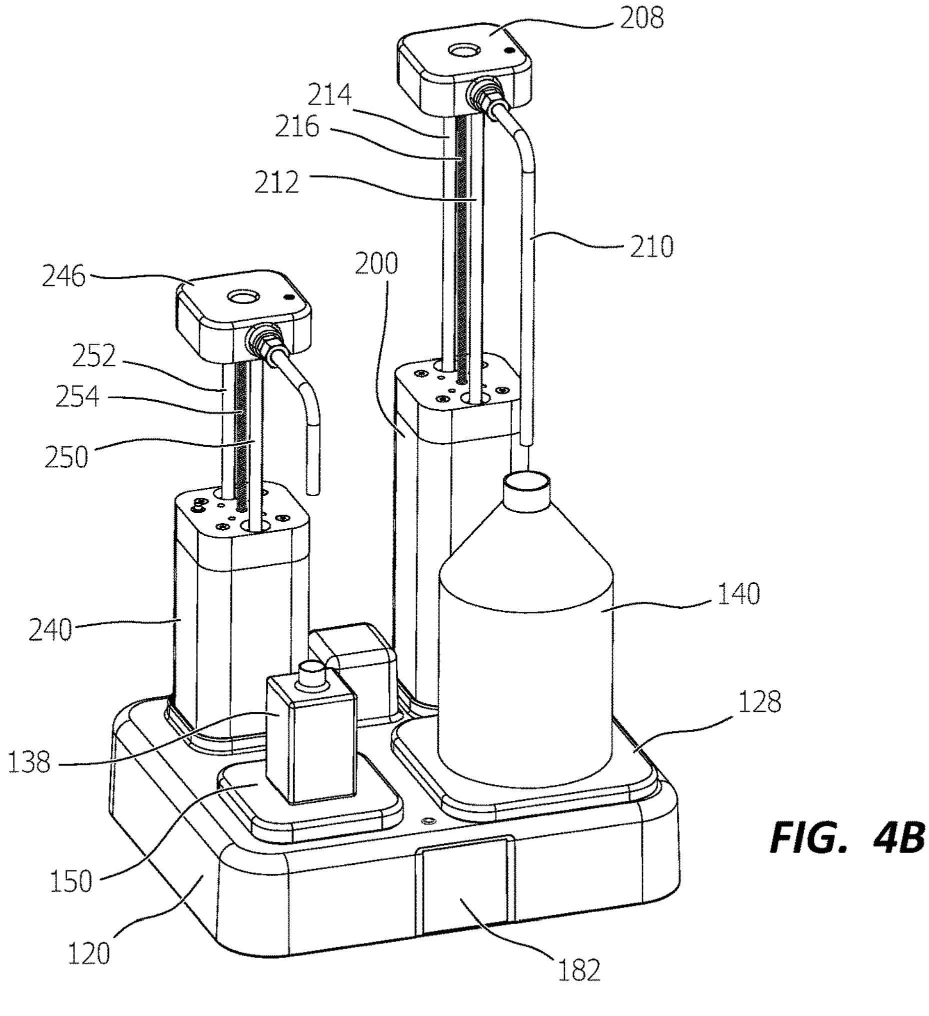
FIG. 4B depicts FIG. 4A with both the bulk source container tower assembly top manifold 208 and the fill jar tower assembly top manifold 246 raised.

A mechanical assembly attached to the bottom side of the bulk source container cap assembly 204 within bulk source tower extruded aluminum central element 200 includes a stepper motor 218, and stepper shaft 216, and a zero setting sensor 220 for the stepper motor 218 positioning of the stepper shaft 216 to selectively raise and lower the bulk source tower top manifold assembly 208 for replacement of the bulk source container 122 when the bulk source container 122 is nearly empty FIGS. 4B, 18A and 18B. An aspect of the fluid dispensing assembly 100 includes a 310 mm bulk source container stepper shaft 216.

An aspect of the fluid dispensing assembly 100 includes bulk source container tower assembly 122 first tube 212 providing first tube 212 open top and bottom ends and sized to fit within bulk source container tower extruded aluminum central element 200 channel 224, wherein a bulk source container tower first tube 212 open top end is fluidly connected to the bulk source container tower external 90-degree bend tube 210 with brass compression fittings 270. A bulk source container tower assembly 122 second tube 214 provides a length and diameter equal to the bulk source container tower assembly 122 first tube 212, wherein the bulk source container tower second tube 214 is sized to fit within a bulk source container tower extruded aluminum central element 200 open channel opposite the bulk source container tower extruded aluminum central element open channel housing the bulk source container tower first tube 212, and attach to the top manifold 208 by a brass compression fitting 270, FIG. 18A. This cross, 180-degree parallel alignment between the extruded aluminum central element 200 first tube 212 and second tube 214 provides increased stability and support to the first tube 212 and second tube 214 when the microprocessor based control element 170 selectively engages the stepper motor 218 to raise and lower the bulk source container tower top manifold assembly 208 for replacement of the bulk source container 122, FIGS. 4B and 18B. An aspect of the fluid dispensing assembly 100 includes 390 mm stainless steel bulk source container first and second tubes, 212 and 214 respectively, the tubes having a 12 mm external diameter and a 9 mm internal diameter.

An aspect of the fluid dispensing assembly 100 includes a fill jar 138 configured to be supported by the fill jar scale assembly 150 on the housing 120 and to receive a fluid and including the fill jar 138 opened top lip and the fill jar 138 passive RFID tag 174, FIGS. 1-8.

An external 90 degree fill jar tube 248 is affixed to the fill jar tower top manifold assembly 246 and is sized to fit within the fill jar 124 opened top to a position below the fill jar 124 open top lip, FIG. 6. An aspect of the fluid dispensing assembly 100 includes stainless steel 90-degree fill jar tube 248.

A mechanical assembly attached to the bottom side of the fill jar tower cap assembly 242 within the fill jar tower central extruded aluminum element 240 includes a stepper motor 256, and stepper shaft 254, and a zero setting sensor 258 for the stepper motor 256 positioning of the stepper shaft 254 to selectively raise and lower the fill jar tower top manifold assembly 246 for replacement of the fill jar 138 when the fill jar 138 is full, FIGS. 3-4B, 6A-6B. Fill jars 138 can be positioned onto the fill jar scale assembly 150 when the fill jars 138 are empty and removed from the fill jar scale assembly 150 when the fill jars 138 are full without raising and lowering the fill jar tower top manifold assembly 246 due to the geometry of these fill jars. An aspect of the fluid dispensing assembly 100 includes a 210 mm fill jar stepper shaft 254.

An aspect of the fluid dispensing assembly 100 includes the fill jar tower assembly 124 configured to be supported by the housing 120, FIGS. 1-8. The fill jar tower assembly 124 includes an extruded aluminum central element 240 having a longitudinal central axis 238, FIG. 8, open top and bottom ends, and four equal sized channels 262 evenly spaced within the extruded aluminum central element 240 around the longitudinal central axis 238, FIG. 3. A fill jar tower cap assembly 242 is sized to fit the fill jar tower central extruded aluminum element 240 open top end. A fill jar tower bottom manifold assembly 260 is sized to fit and close the jar tower central extruded aluminum element 240 open bottom end. The fill jar tower assembly bottom manifold assembly 260 is fluidly connected to any extruded aluminum central element 240 channel 262 housing a tube fluidly connected to the fill jar tower top manifold assembly 246 by brass compression fitting 270, FIGS. 3, 4B, 6A-6B.

Figure 6A:
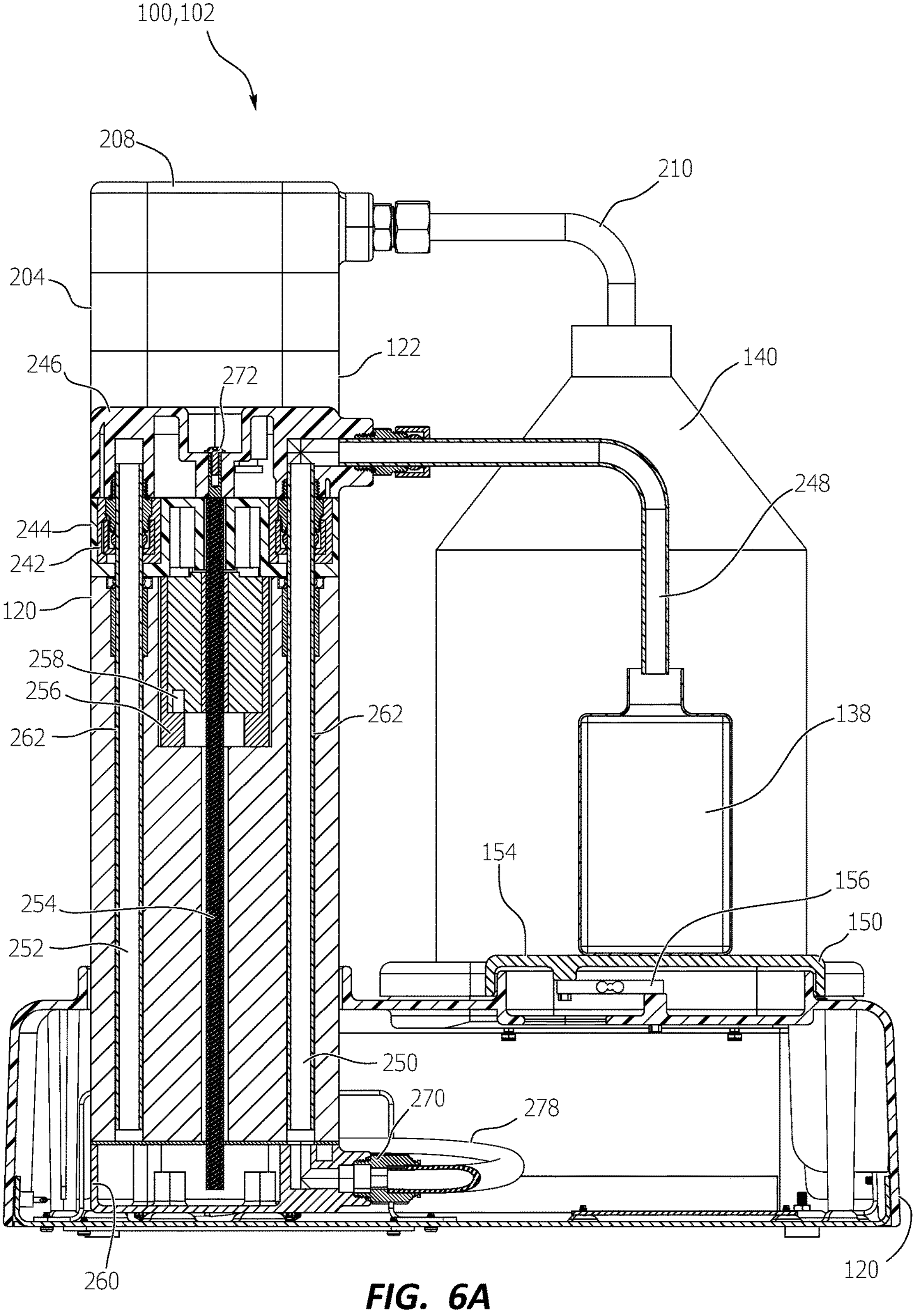
FIG. 6A depicts a cross-sectional view of FIG. 5 taken at "6-6."
Figure 6B:
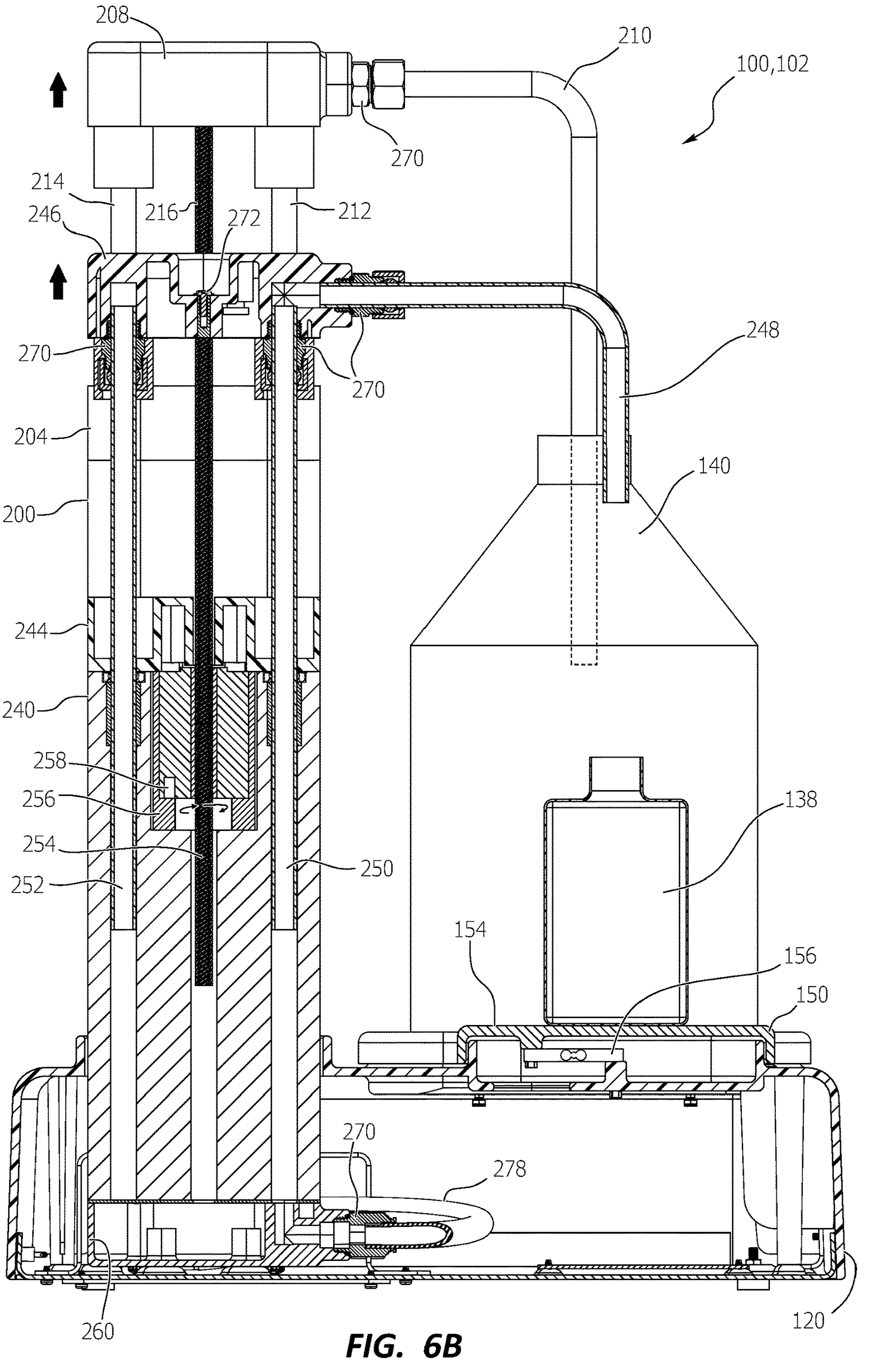
FIG. 6B depicts a cross-sectional view of FIG. 5 taken at "6-6" with both the bulk source container tower assembly top manifold 208 and the fill jar tower assembly top manifold 246 raised as depicted in FIG. 4B.

An aspect of the fluid dispensing assembly 100 includes the fill jar tower assembly 124 first tube 250 providing first tube 250 open top and bottom ends and sized to fit within one fill jar tower extruded aluminum central element 240 open channel, wherein a fill jar tower first tube 250 open top end is fluidly connected to the fill jar tower external 90 degree bend tube 248 by brass compression fittings 270 and the top manifold 246, FIGS. 4B, and 6A and 6B. A fill jar tower assembly 124 second tube 252 provides a length and diameter equal to the fill jar tower assembly 124 first tube 250, wherein the fill jar tower second tube 252 is sized to fit within a fill jar tower extruded aluminum central element 240 open channel opposite the fill jar tower extruded aluminum central element open channel housing the fill jar tower first tube 250, and attach to the bottom of the top manifold 246 by brass compression fitting 270, FIGS. 4B, 6A and 6B. This cross, 180-degree parallel alignment between the extruded aluminum central element 240 first tube 250 and second tube 252 provides increased stability and support to the first tube 250 and second tube 252 when the microprocessor based control element 170 selectively engages the stepper motor 256 to raise and lower the fill jar tower top manifold assembly 246 for replacement of the full fill jar 124, FIGS. 4B, 6A and 6B. An aspect of the fluid dispensing assembly 100 includes 295 mm stainless steel fill jar first and second tubes, 250 and 252 respectively, the tubes having a 12 mm internal diameter.

An aspect of the fluid dispensing assembly 100 includes the microprocessor based control element 170, FIGS. 7 and 8, electronically coupled within the housing 120 to i) the bulk source container tower assembly 122, ii) the fill jar tower assembly 124, iii) the pumping assembly 158, iv) the mechanical assemblies to selectively raise and lower the bulk source container tower top manifold assembly 208 and the fill jar tower top manifold assembly 246, v) the bulk source container scale assembly 128, vi) the fill jar scale assembly 150, vii) the bulk source container radio frequency active reader 176, viii) the fill jar radio frequency active reader 178, ix) the LCD assembly 180, x) the on/off switch 190, and xi) the power jack (AC-DC) adapter 192. The microprocessor based control element 170 includes a non-transitory computer readable memory medium storing program instructions executable by processing circuitry for a fluid dispensing assembly and system.

An aspect of the fluid dispensing assembly 100 includes the bulk source container tower bottom manifold assembly 222 providing a tube 278 fluidly connecting a bulk source container tower channel 224 housing the bulk source container first tube 212 to a pumping assembly 158 intake end within the case assembly 118, FIGS. 3, 7, 8, 18A and 18B. An aspect of the fluid dispensing assembly 100 provides a polypropylene tube 278 having an external diameter of 12 mm and an internal diameter of 9 mm.

An aspect of the fluid dispensing assembly 100 includes the fill jar tower bottom manifold assembly 260 providing a tube 278 fluidly connecting a fill jar tower channel 262 housing the fill jar tower first tube 250 to a pumping assembly 158 discharge end within the case assembly 118, FIGS. 3, 6A-8. An aspect of the fluid dispensing assembly 100 provides a polypropylene tube 278 having an external diameter of 12 mm and an internal diameter of 9 mm.

The pumping assembly 158 intake end and discharge end are fluidly connected to a pump 160 for fluid flow from the bulk source container 140 to the fill jar 138. An aspect of the fluid dispensing assembly 100 pump 160 includes a peristaltic pump 160 with a flow rate of up to 3100 ml/minute.

Figure 5:
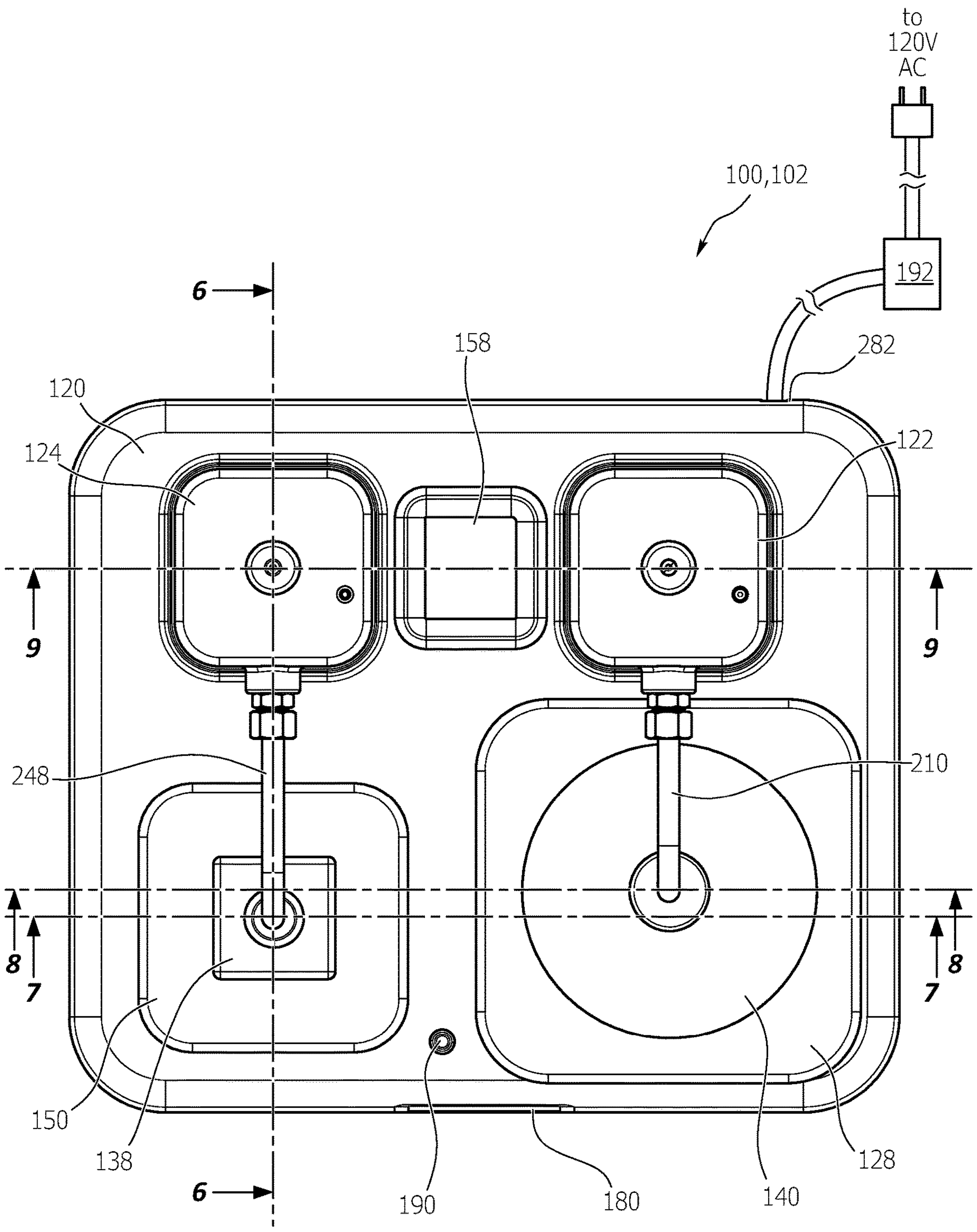
FIG. 5 depicts a top plan view of FIGS. 1 and 4B.

An aspect of the fluid dispensing assembly 100 includes the power jack 192 on a 120 Volt AC cord to connect to the housing 120 at input 282, FIG. 5, configured to adapt the alternating current source of electrical power to a direct current source of electrical power for the fluid dispensing assembly 100 to selectively refill the fill jar 138 from the source container 140. Other than an external power cord to connect to 120-volt AC, all electrical converters, wiring, and associated connectivity (not shown) for the filling station components requiring power are within the housing 120, the case assembly 118, the bulk source container power assembly 122, or the fill jar tower assembly 124.

An aspect of the fluid dispensing assembly 100 includes the microprocessor based control element 170 positioned within the case assembly 118, FIGS. 7 and 8. The microprocessor based control element 170 selectively generates a dispensing sequence and selectively turns the pumping assembly 158 on and off based upon real time active RFID reader inputs and real time weight inputs from both the bulk source container scale assembly 128 and the fill jar scale assembly 150, FIGS. 5-8.

An aspect of the fluid dispensing assembly 100 includes the microprocessor based control element 170 providing an electronic memory module containing a database pertaining to the source container and the fill jar, the database being retrievable to a remote data server via wireless communication or by direct access through a USB connection port in a wall of the housing (not shown) below electrical input 282, FIG. 5.

An aspect of the fluid dispensing assembly 100 includes the LCD assembly 180 including an interactive LCD output display 182, LCD support frame 184, and LCD screen bezel positioned on and coupled to a front wall of the housing wherein the interactive LCD output display 182 is configured to be viewed, FIGS. 2-5, the LCD output display 182 being electronically coupled to the microprocessor based control element 170 wherein real time fluid dispensing operational parameters and apparatus diagnostics are provided.

An aspect of a fluid dispensing system 102 configured to selectively refill a jar includes a housing 120 providing a case assembly 118 and supported by a chassis 126 configured to be positioned on a support surface, FIGS. 1, 2 8, and 9. This aspect of a fluid dispensing system 102 provides a microprocessor based control element 170 within the case assembly including wireless and USB connectivity and electronically coupled within the housing 120 to, i) the bulk source container tower assembly 122, ii) the fill jar tower assembly 124, iii) the pumping assembly 158, iv) the mechanical assemblies 226 and 264 to selectively raise and lower the bulk source container tower top manifold assembly 208 and the fill jar tower top manifold assembly 246, v) the bulk source container scale assembly 128, vi) the fill jar scale assembly 150, vii) the bulk source container radio frequency identification (RFID) active reader 176, viii) the fill jar RFID active reader 178, ix) the LCD display panel assembly 180, x) the on/off switch 190, and xi) the power jack (AC-DC) adapter 192, FIGS. 1-18C.

An aspect of a fluid dispensing system 102 configured to selectively refill a jar further includes the bulk source container 140 configured to be supported by the bulk source container scale assembly 128 on the housing 120 and to contain a fluid and including the bulk source container 140 opened top and the bulk source container 140 radio frequency identification 172 passive tag, FIGS. 1, 2, 4A and 4B.

An aspect of a fluid dispensing system 102 configured to selectively refill a jar further includes a bulk source container tower assembly 122 configured to be supported by the housing 120 and including i) an extruded aluminum central element 200 having a longitudinal central axis 198, open top and bottom ends, and four equal sized channels 224 evenly spaced within the extruded aluminum central element 200 around the longitudinal central axis 198, ii) the bulk source container tower cap assembly 206 sized to fit and close the bulk source container tower extruded aluminum central element 200 open top end, iii) a bulk source container tower bottom manifold assembly 222 sized to fit and close the bulk source container tower extruded aluminum central element 200 open bottom end and fluidly connected to any channel 224 housing the first flow tube 210, iv) an external 90 degree bend tube 210 affixed to the bulk source container tower top manifold assembly 208 and sized to fit within a bulk source container 140 opened top to a position above a bulk source container 140 internal bottom surface, FIG. 7, and v) the stepper motor 218 to selectively raise and lower the bulk source container tower top manifold assembly 208 for replacement of the bulk source container 140 when the bulk source container 140 is empty, FIGS. 1-5, 13-18C.

An aspect of a fluid dispensing system 102 configured to selectively refill a jar further includes the fill jar 138 configured to be supported by the fill jar scale assembly 150 on the housing 120 and to receive a fluid and including the fill jar 138 opened top and the fill jar 138 radio frequency identification 174 passive tag, FIGS. 1, 2, 4A and 4B.

An aspect of a fluid dispensing system 102 configured to selectively refill a jar further includes the fill jar tower assembly 124 configured to be supported by the housing 120, and having i) an extruded aluminum central element 240 comprising an longitudinal central axis 238, open top and bottom ends, and four equal sized channels 262 evenly spaced within the extruded aluminum central element 240 around the longitudinal central axis 238, ii) a fill jar tower cap assembly 206 sized to fit and close the one fill jar tower extruded aluminum central element 240 open top end, iii) a fill jar tower bottom manifold assembly 260 sized to fit and close the fill jar tower extruded aluminum central element 240 open bottom end and fluidly connected to any channel 262 housing the first flow tube 250, iv) an external 90 degree fill jar tube 248 affixed to the fill jar tower top manifold assembly 208 and sized to fit within a fill jar 138 opened top to a position below a fill jar 138 opened top lip, and v) the stepper motor 256 to selectively raise and lower the fill jar tower assembly 124 top manifold assembly 208 for replacement of the fill jar 138 when the fill jar 138 is full, FIGS. 1-6B.

An aspect of a fluid dispensing system 102 configured to selectively refill a jar further includes the power jack 192 on a 120 Volt AC cord to connect to the housing 120 at input 282, FIG. 5, configured to adapt the alternating current source of electrical power to a direct current source of electrical power for the fluid dispensing assembly 100 to selectively refill the fill jar 138 from the source container 140.

An aspect of a fluid dispensing system 102 configured to selectively refill a jar further includes the bulk source container tower assembly 122 which includes the bulk source container tower extrusion bushing 202, the bulk source container tower cap assembly 204, the bulk source container tower cap assembly mold-in insert 206, the bulk source container tower top manifold 208, a bulk source container tower first tube 212 top end fluidly connected to the external 90 degree bend tube 210, and the bulk source container tower second tube 214, and wherein the mechanical assembly 234 to selectively raise and lower the bulk source container tower top manifold 208 comprises the bulk source container tower stepper source shaft 216, the bulk source container tower stepper motor 218, and the bulk source container tower sensor 220. The bulk source container tower sensor 220 residing in the bulk source container tower cap assembly mold-in insert 206 provides a zero setting reference for the bulk source container stepper motor 218 positioning of the bulk source container stepper source shaft 216, FIGS. 1-5, 13-18C.

An aspect of a fluid dispensing system 102 configured to selectively refill a jar further includes the fill jar tower assembly 124 which includes the fill jar tower extrusion bushing 242, the fill jar tower cap assembly 242, a fill jar tower cap assembly mold-in insert 244, the fill jar tower top manifold 246, the fill jar tower first tube 250 fluidly connected to the fill jar tower external 90 degree bend tube 248, and a fill jar tower second tube 252, and wherein the mechanical assembly 264 to selectively raise and lower the fill jar tower top manifold 246 includes a fill jar tower stepper source shaft 254, a fill jar tower stepper motor 256, and a jar fill tower sensor 258. The fill jar tower sensor 220 residing in the fill jar tower cap assembly mold-in insert 244 provides a zero-setting reference for the fill jar tower stepper motor 256 positioning of the fill jar tower stepper source shaft 216, FIGS. 1-6B.

Figure 9:
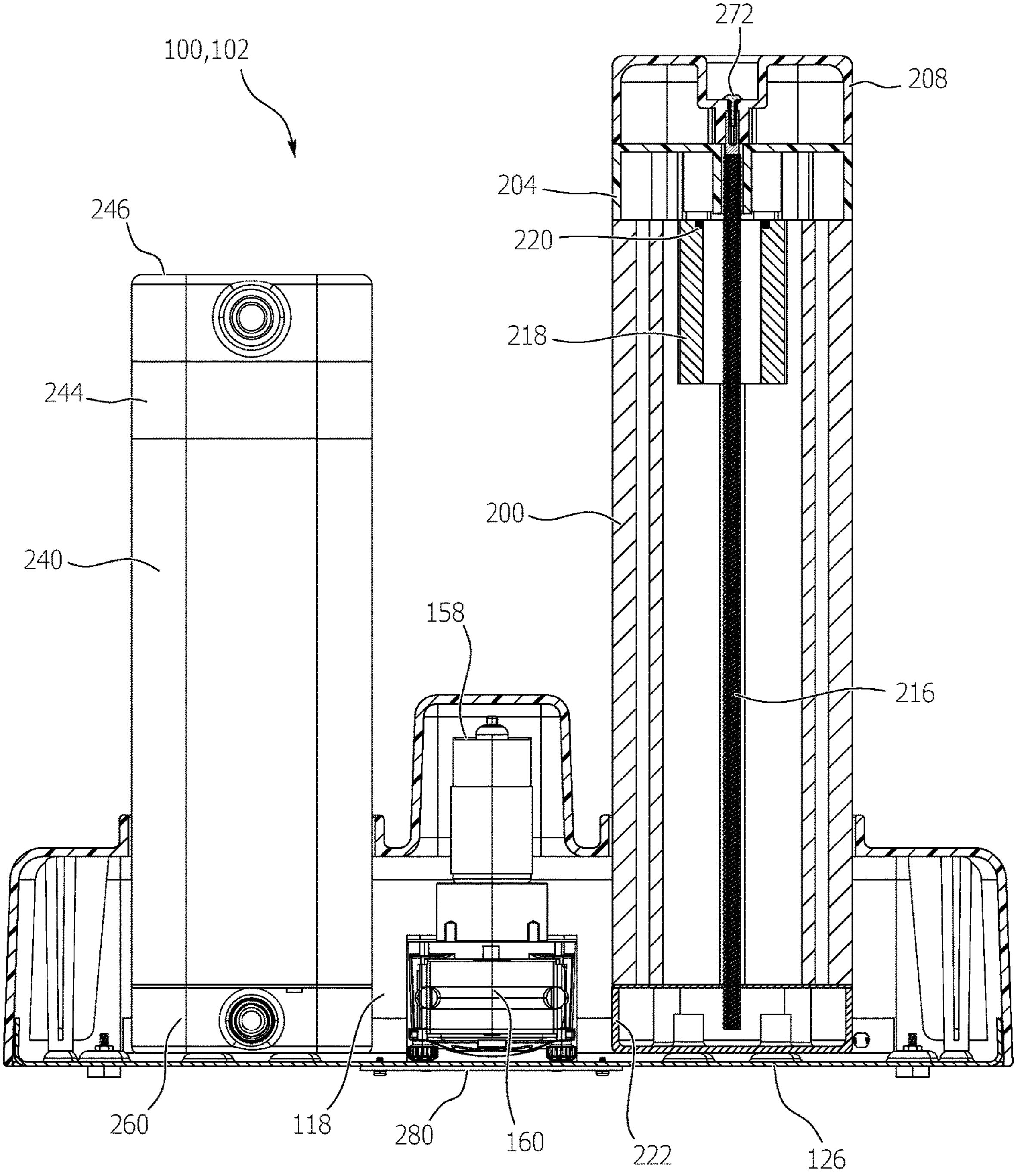
FIG. 9 depicts a cross-sectional view of FIG. 5 taken at "9-9."
Figure 10:
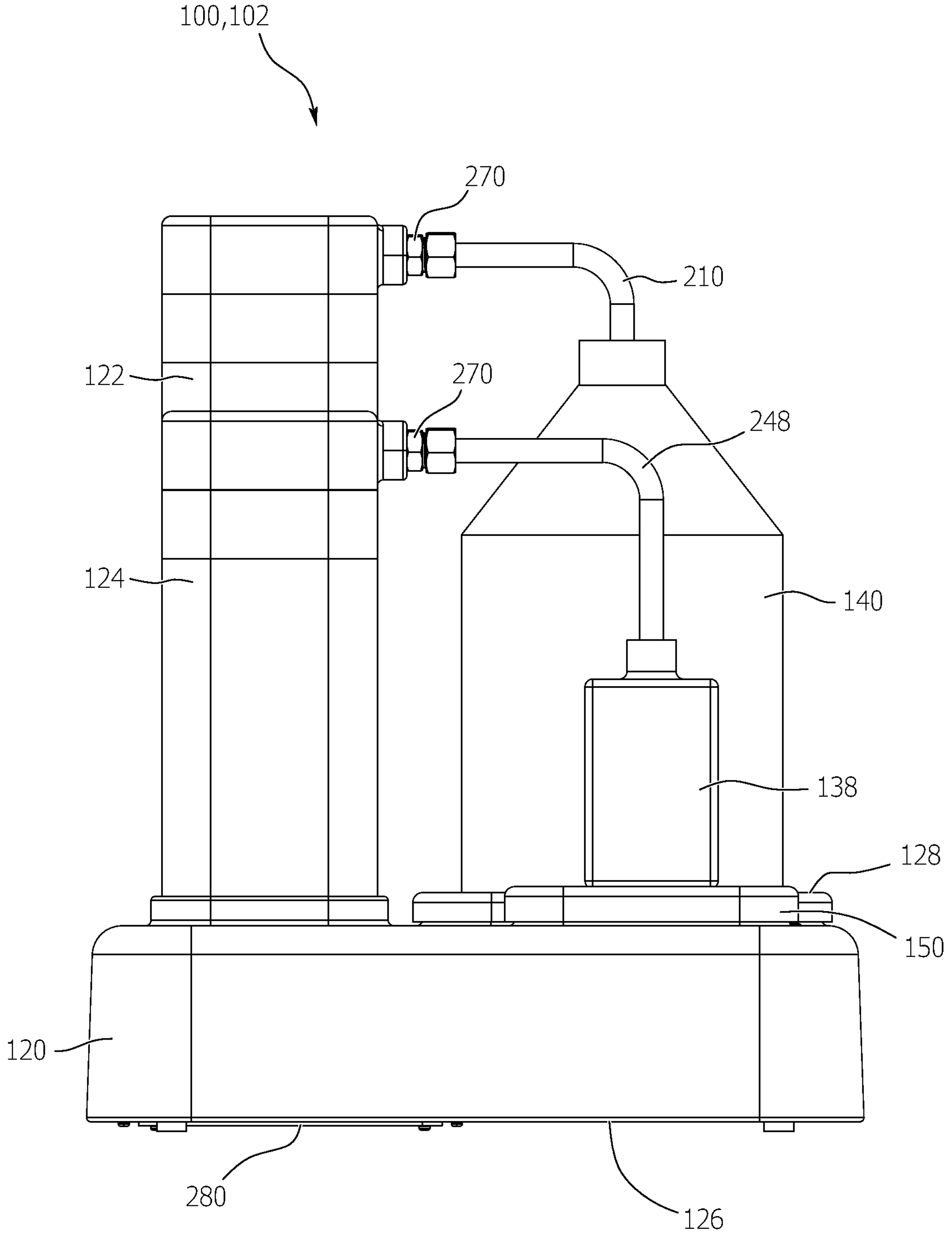
FIG. 10 depicts a right side elevation view of FIG. 1.
Figure 11:
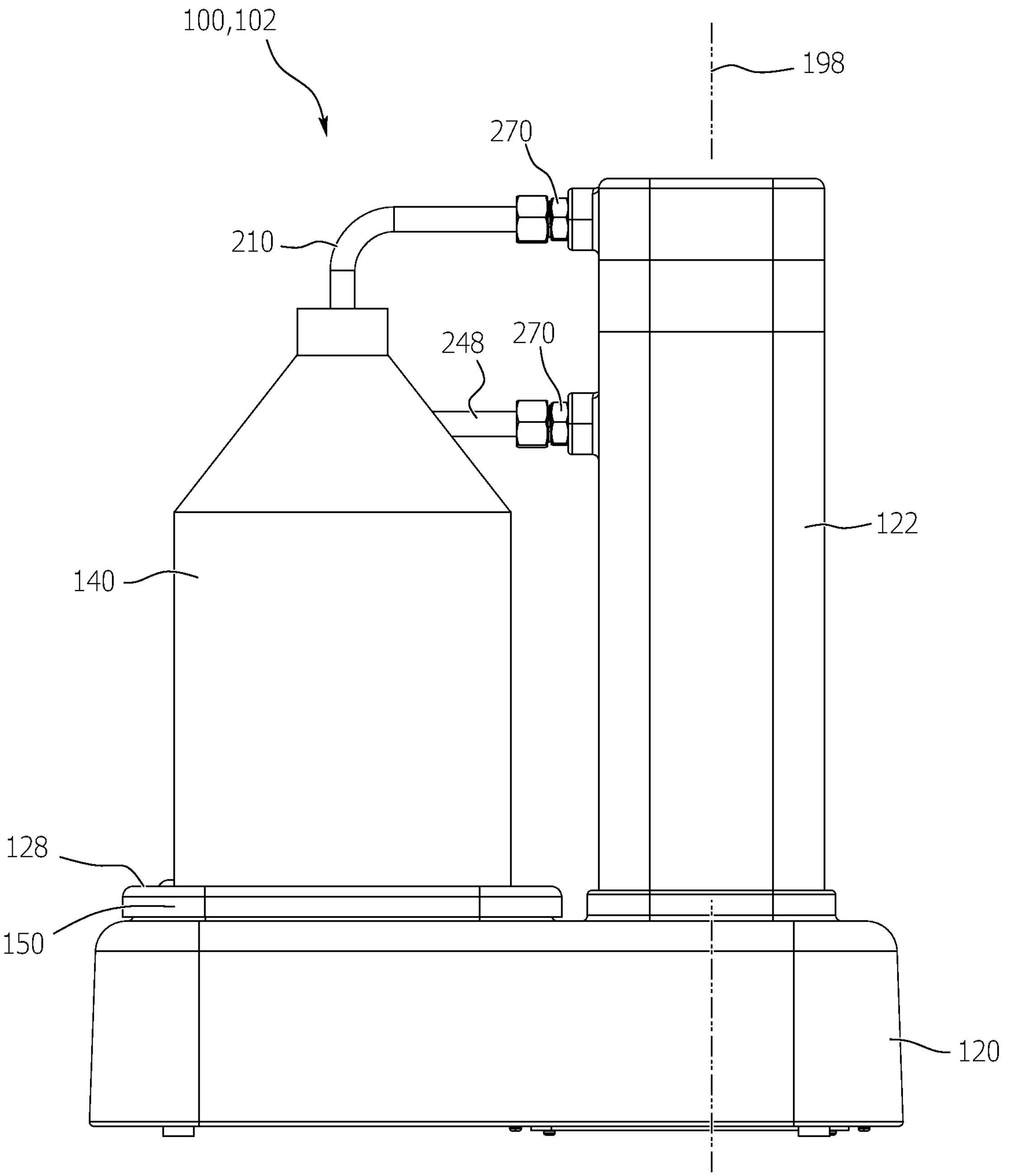
FIG. 11 depicts a left side elevation view of FIG. 1.
Figure 12:
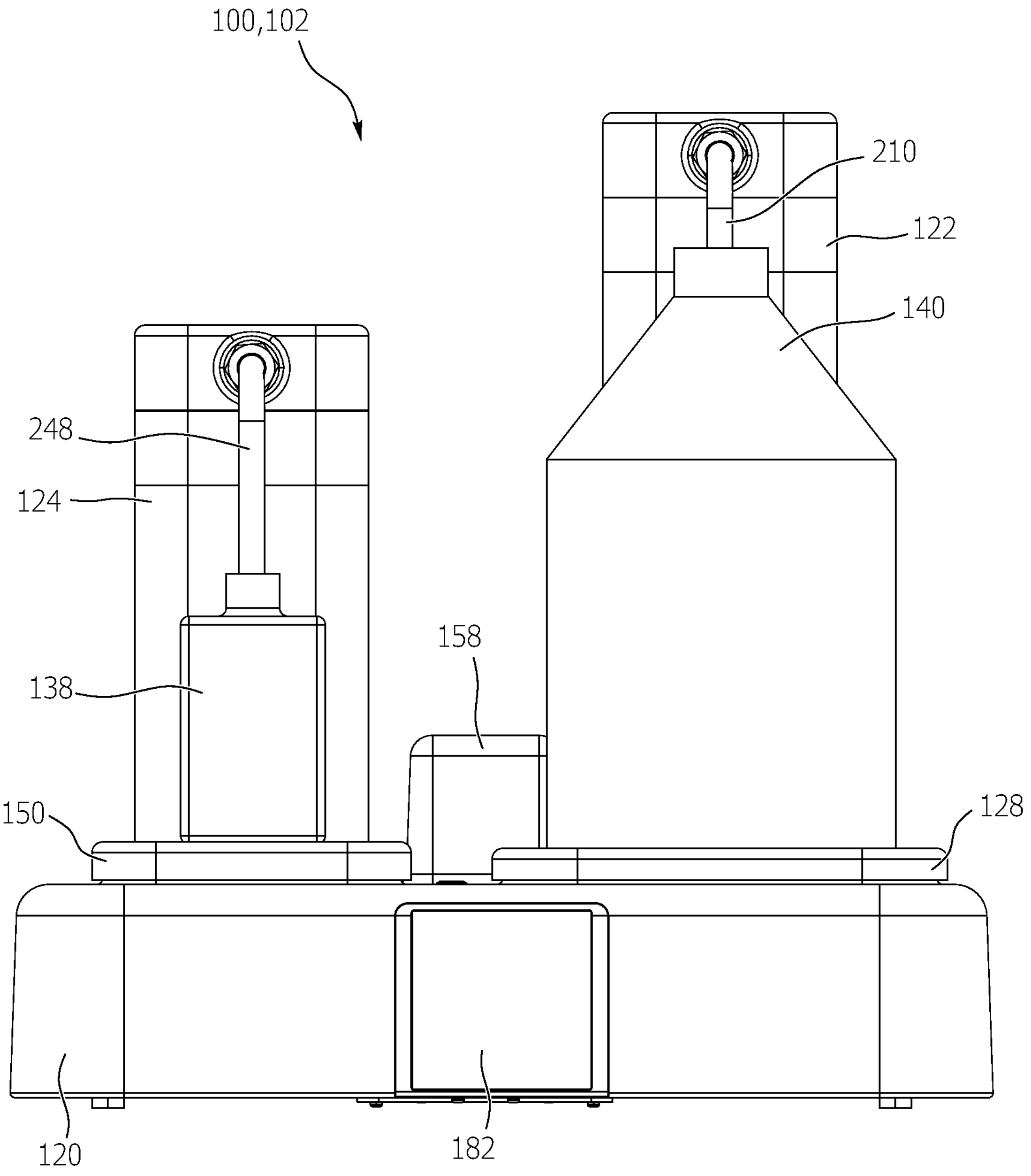
FIG. 12 depicts a front elevation view of an aspect of the filling station apparatus 100 and the filling station system 102.
Figure 13:
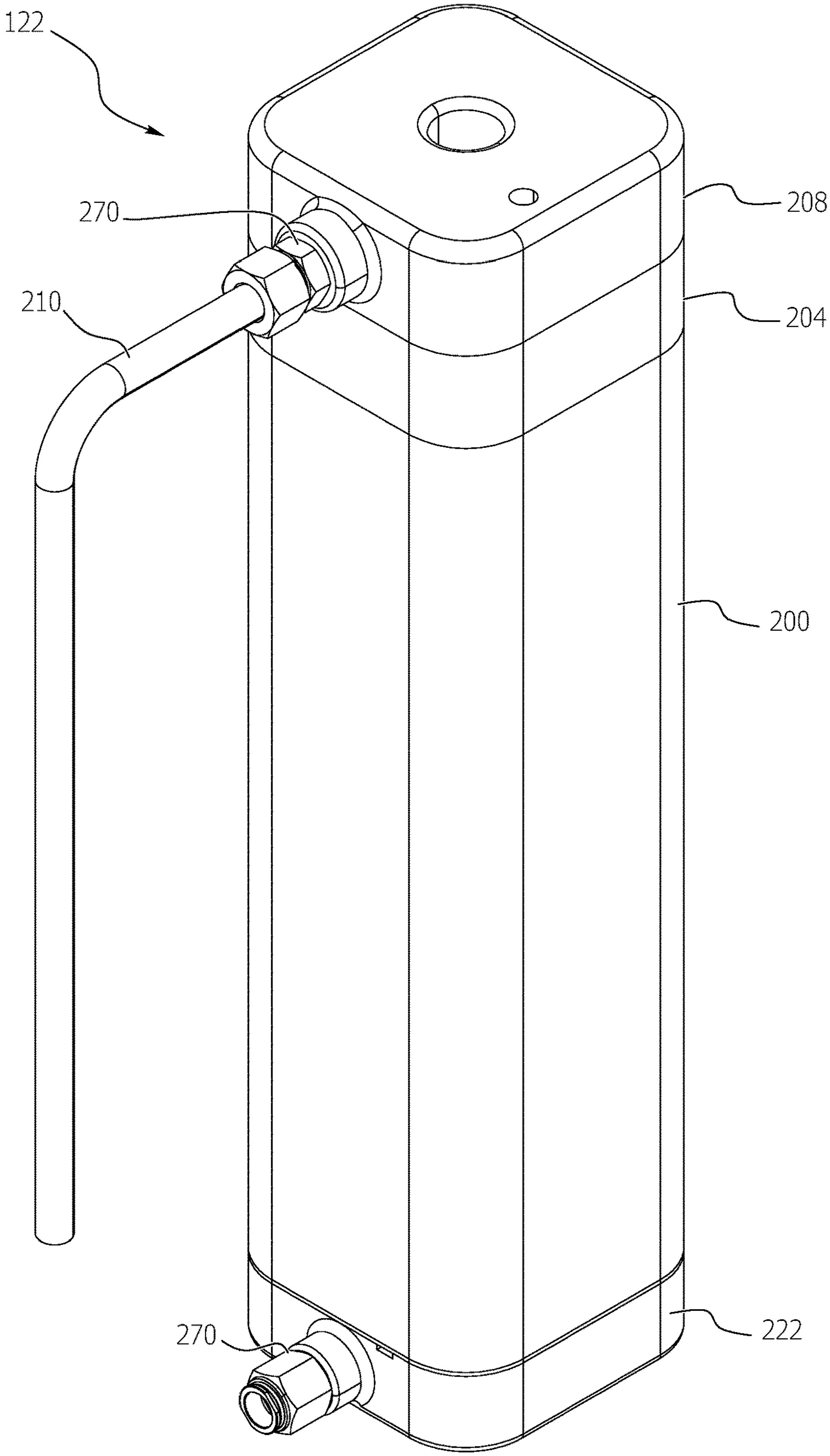
FIG. 13 depicts a top right perspective view of the bulk source container tower assembly 200 for an aspect of the filling station apparatus 100 and the filling station system 102.
Figure 14:
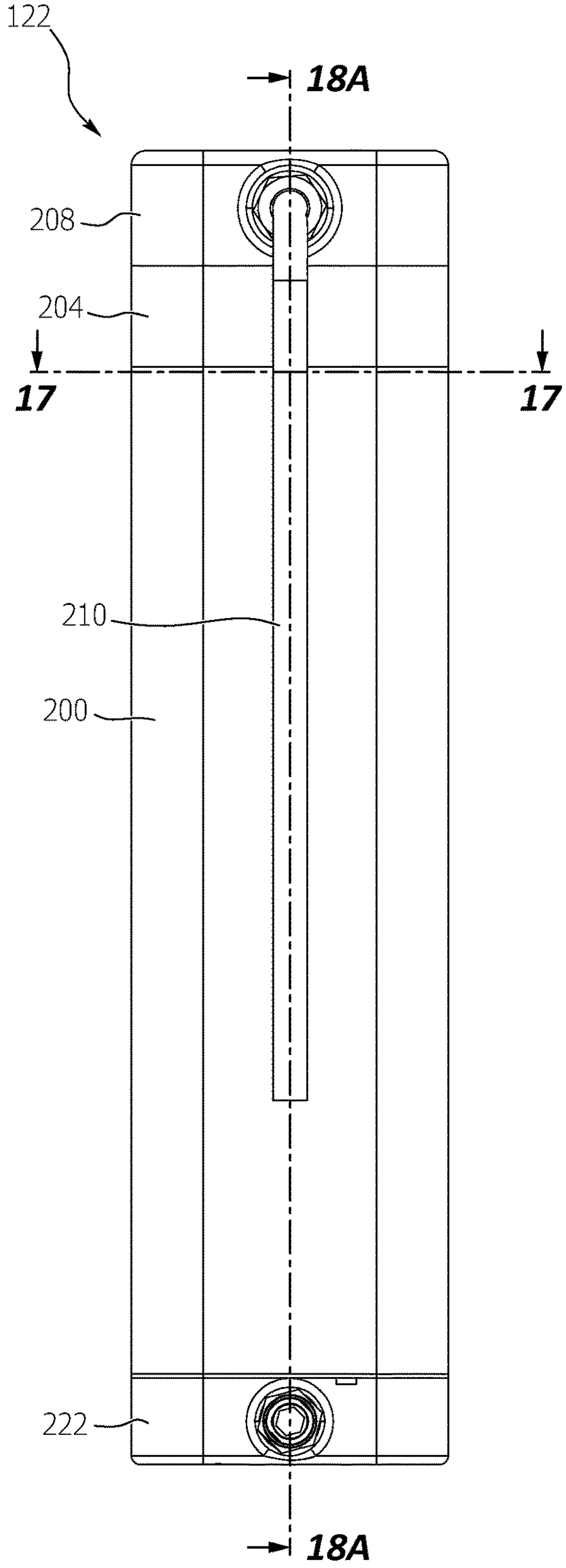
FIG. 14 depicts a front elevation view of FIG. 13.
Figure 15:
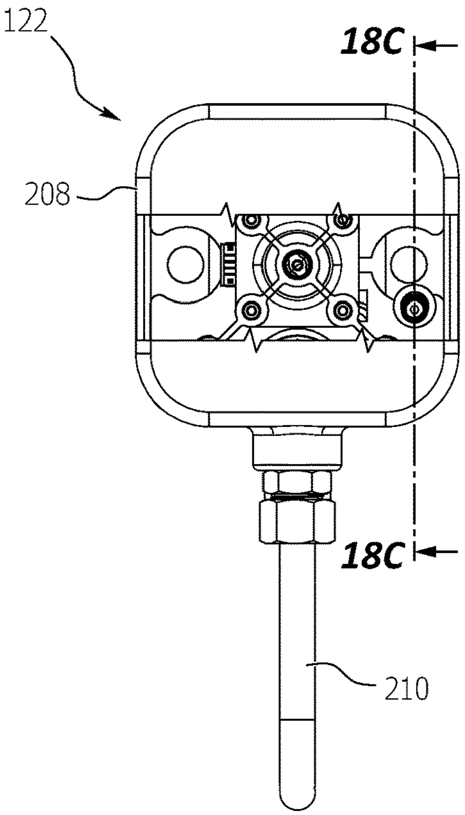
FIG. 15 depicts a top planar view of FIG. 13 with a portion of the manifold top surface to reveal a portion of the internal manifold.
Figure 16:
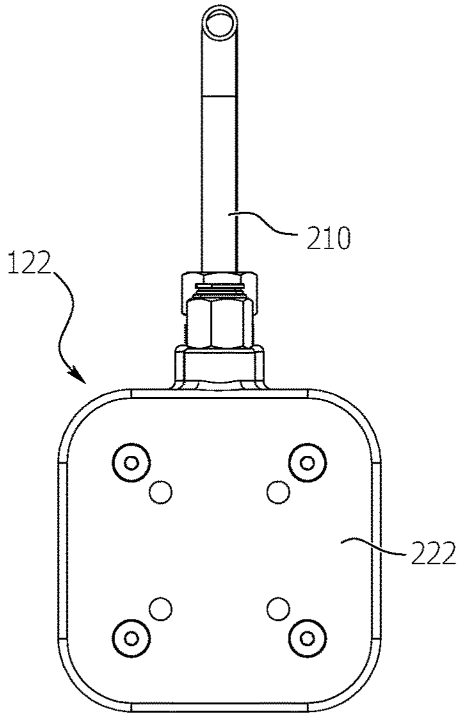
FIG. 16 depicts a bottom planar view of FIG. 13.
Figure 17:
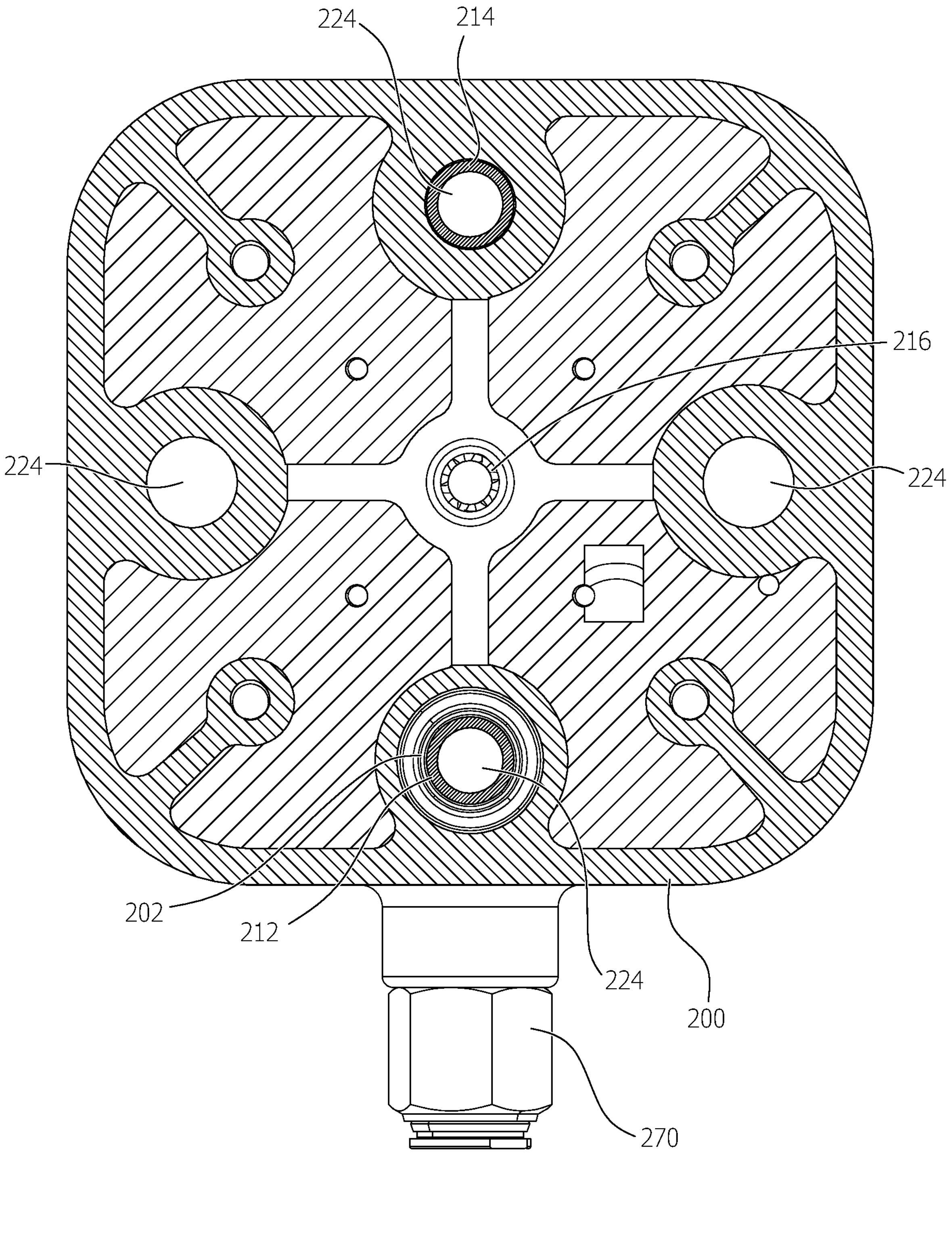
FIG. 17 depicts a cross-sectional view of FIG. 14 taken at "17-17."

An aspect of a fluid dispensing system 102 configured to selectively refill a jar further provides the bulk source container tower bottom manifold assembly 222 providing a tube 278 fluidly connecting the bulk source container tower first tube 220 bottom end to a pumping assembly 158 intake end within the housing case assembly 118, FIGS. 7-9.

An aspect of a fluid dispensing system 102 configured to selectively refill a jar further provides the fill jar tower bottom manifold assembly 260 providing a tube fluidly connecting the fill jar tower first tube 220 bottom end to a pumping assembly 158 discharge end within the housing case assembly 118, FIGS. 6A-9.

An aspect of a fluid dispensing system 102 configured to selectively refill a jar further provides i) the bulk source container scale assembly 130, whereby the bulk source container 140 is supported by the bulk source container platform 132 on the housing 120 in proximate location to the bulk source container tower assembly 122 such that an input end of the external 90 degree bend tube 210 affixed to the bulk source container tower top manifold 208 is centered above the bulk source container 140 opened top the bulk source container on the bulk source container platform 132, ii) the bulk source container RFID passive tag active reader 176, and iii) strain gauge sensors 134 below the bulk source container platform 132 within the housing 120, FIGS. 3-8.

An aspect of a fluid dispensing system 102 configured to selectively refill a jar further provides i) the fill jar scale assembly 150, whereby the fill jar 138 is supported by the fill jar platform 154 on the housing 120 in proximate location to the fill jar tower assembly 124 such that an input end of the external 90 degree bend tube 248 affixed to the fill jar tower top manifold 246 is centered above the fill jar 138 opened top the fill jar on the fill jar housing platform 154, ii) the fill jar RFID passive tag active reader 178, and iii) strain gauge sensor 156 below the fill jar platform 154 within the housing 120, FIGS. 3-8.

An aspect of a fluid dispensing system 102 configured to selectively refill a jar further includes the microprocessor based control element 170 positioned within the case assembly 118, FIGS. 7 and 8, to generate a fluid dispensing sequence and selective turn the pumping assembly on and off based upon real time RFID inputs and real time weight inputs from both the bulk source container scale assembly 128 and the fill jar scale assembly 150, FIG. 4B.

An aspect of a fluid dispensing system 102 configured to selectively refill a jar further includes the microprocessor based control element 170, FIGS. 7 and 8, having an electronic memory module containing a database pertaining to fluid dispensing system 102 real time operational dynamics, the bulk source container 140 contents and the fill jar 138 contents.

An aspect of a fluid dispensing system 102 configured to selectively refill a jar further includes the LCD panel assembly 180 having an LCD support frame 184, an LCD screen bezel 186, and an interactive LCD output display 182 coupled to a front wall of the housing 120 wherein the LCD output display 182 is configured to be viewed, the LCD output display 182 being electronically coupled to the microprocessor based control element 170 wherein real time fluid dispensing operational parameters are provided by the microprocessor based control element 170, FIGS. 2-5.

Figure 2:
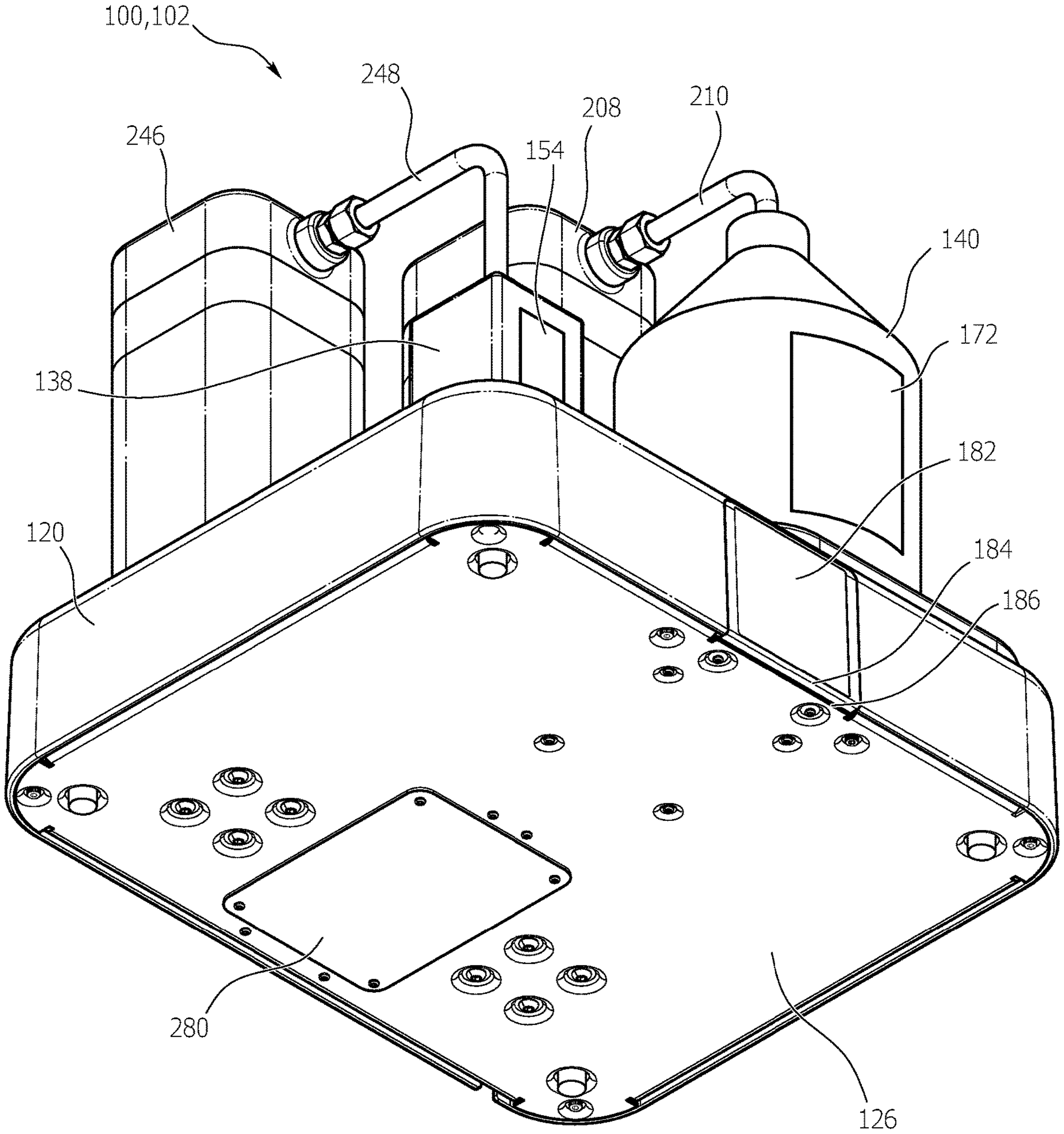
FIG. 2 depicts a bottom left perspective view of FIG. 1.
Figure 3:
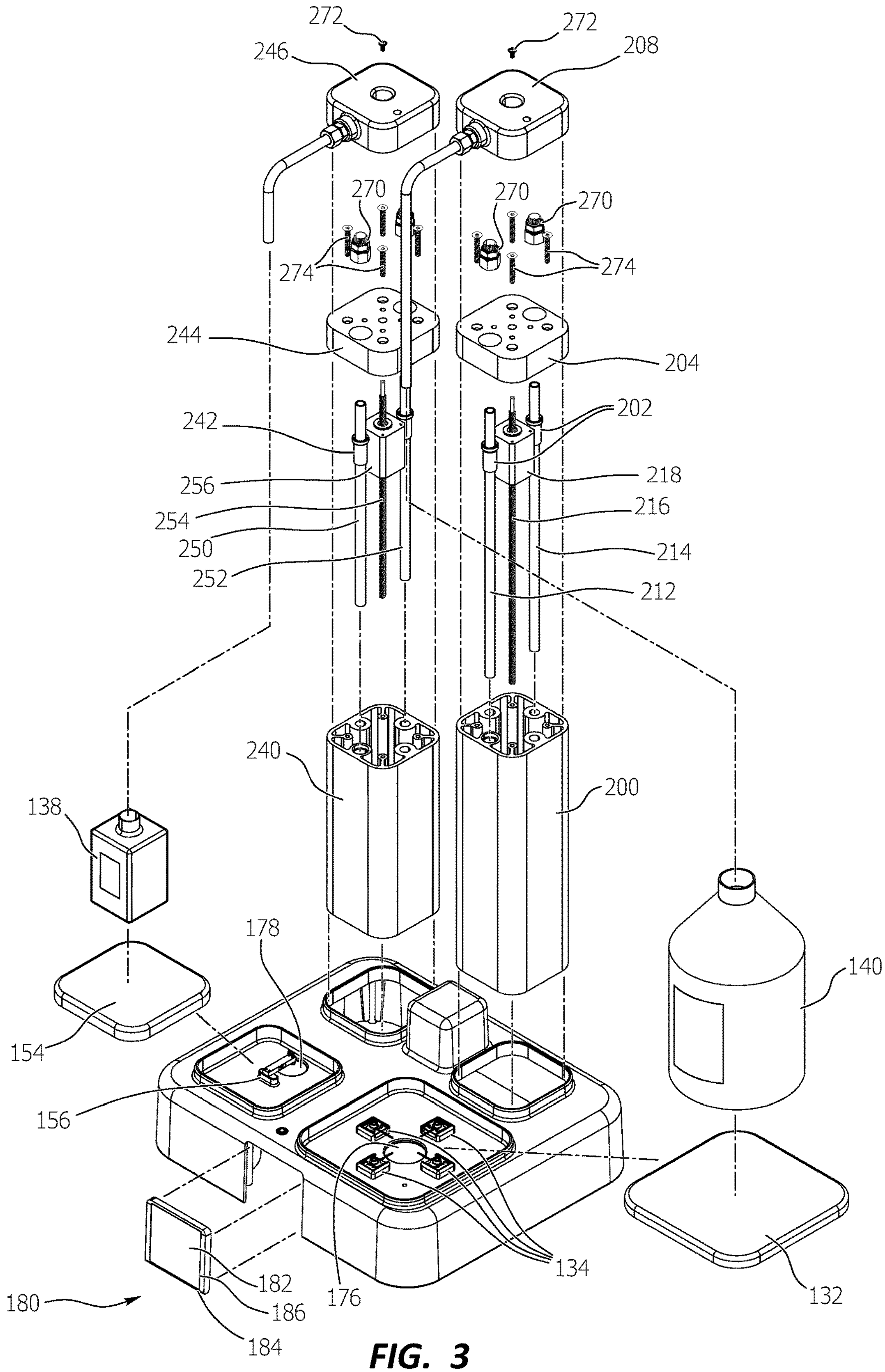
FIG. 3 depicts an exploded perspective view of FIG. 1.

An aspect of the fluid dispensing system 102 provides the bulk source container 140 and the fill jar 138 to have a unique identifier printed and/or embedded on it, FIGS. 1 and 2. This unique identifier is an electronic identifier, namely the RFID passive tag, 172 and 174, respectively, which contains information about the bulk source container 140 and the fill jar 138 to which it is attached. Such information may include, but not be limited to, the most recent bulk source container 140 and the fill jar 138 testing date, the bulk source container 140 and the fill jar 138 type, the bulk source container 140 and the fill jar 138 size, the bulk source container 140 and the fill jar 138 product identification, the bulk source container 140 and the fill jar 138 product properties and the bulk source container 140 and the fill jar 138 tare weight, filled weight, and volume. The RFID identifier provides a means to track each bulk source container 140 and fill jar 138 and user data. For example, by tracking and monitoring the bulk source container 140 and the fill jar 138 with an RFID identifier, the manufacturer or distributor of these refillable items, and or the fluids to be provided therein, can tell how many times the item was filled and in what period, the age and durability of the item, can track user consumption habits, and for safety and production purposes determine if the system 102 and/or the fluid dispensing assembly 100 components are approaching projected use limits, disabling the fluid dispensing system 102 until those components have been replaced. The RFID identifier can screen source or refillable fluid containers that are not proprietary to the fluid dispensing system 102.

Thus, an aspect of a fluid dispensing system 102 configured to selectively refill a jar includes the microprocessor-based control element 170 positioned within the housing case assembly 118 to selectively generate a fluid dispensing sequence and selectively turn a housing based pumping assembly 158 electrically coupled to the microprocessor-based control element 170 on and off based upon real time RFID active reader inputs, 176 and 178, and real time weight inputs from a housing based bulk source container scale assembly 128 and a housing based fill jar scale assembly 150, both electrically coupled to the microprocessor-based control element 170, FIGS. 1-18C.

An aspect of a fluid dispensing system 102 configured to selectively refill a jar further includes the bulk source container tower assembly 122 and the fill jar tower assembly within the housing 120 on either side of and fluidly connected to the pumping assembly 158, whereby the tower assemblies are electrically coupled to the microprocessor-based control element 170 and the tower assemblies are positioned proximate to its respective scale assembly such that the input end of an external 90 degree bend tube 210 affixed to the bulk source container tower top manifold 208 is centered above the bulk source container 140 positioned on the bulk source container scale assembly 128 and an output end of an external 90 degree bend tube 248 affixed to a fill jar tower top manifold 246 is centered above a fill jar positioned on the fill jar scale assembly 150, FIGS. 1-18C.

An aspect of a fluid dispensing system 102 configured to selectively refill a jar further includes the microprocessor-based control element 170 selectively raising the bulk source container tower top manifold 208 as needed to remove and replace an empty bulk source container 140 or to flush a fluid system and then lowering the bulk source container tower top manifold 208 back to an operational state for refilling an empty fill jar 138, FIGS. 4B, 6B, and 18B.

An aspect of a fluid dispensing system 102 configured to selectively refill a jar further includes the microprocessor-based control element selectively raising the fill jar tower top manifold 246 as needed to remove a full fill jar 138 and add an empty fill jar 138 or to flush the fluid system and then lowering the fill jar tower top manifold 246 back to an operational state for refilling an empty fill jar 138, FIGS. 4B, 6B.

An aspect of a fluid dispensing system 102 configured to selectively refill a jar further includes the one microprocessor-based control element 170 having an electronic memory module containing a database pertaining to fluid dispensing system 102 real time operational dynamics, the bulk source container 140 contents and the fill jar 138 contents.

An aspect of a fluid dispensing system 102 configured to selectively refill a jar further includes the LCD panel assembly 180 having an LCD support frame 184, an LCD screen bezel 186, and an interactive LCD output display 182 coupled to a front wall of the housing 120 wherein the LCD output display 182 is configured to be viewed, the LCD output display 182 being electronically coupled to the microprocessor-based control element 170 wherein real time fluid dispensing operational parameters are provided by the microprocessor-based control element 170, FIGS. 2-5.

Figure 19A:
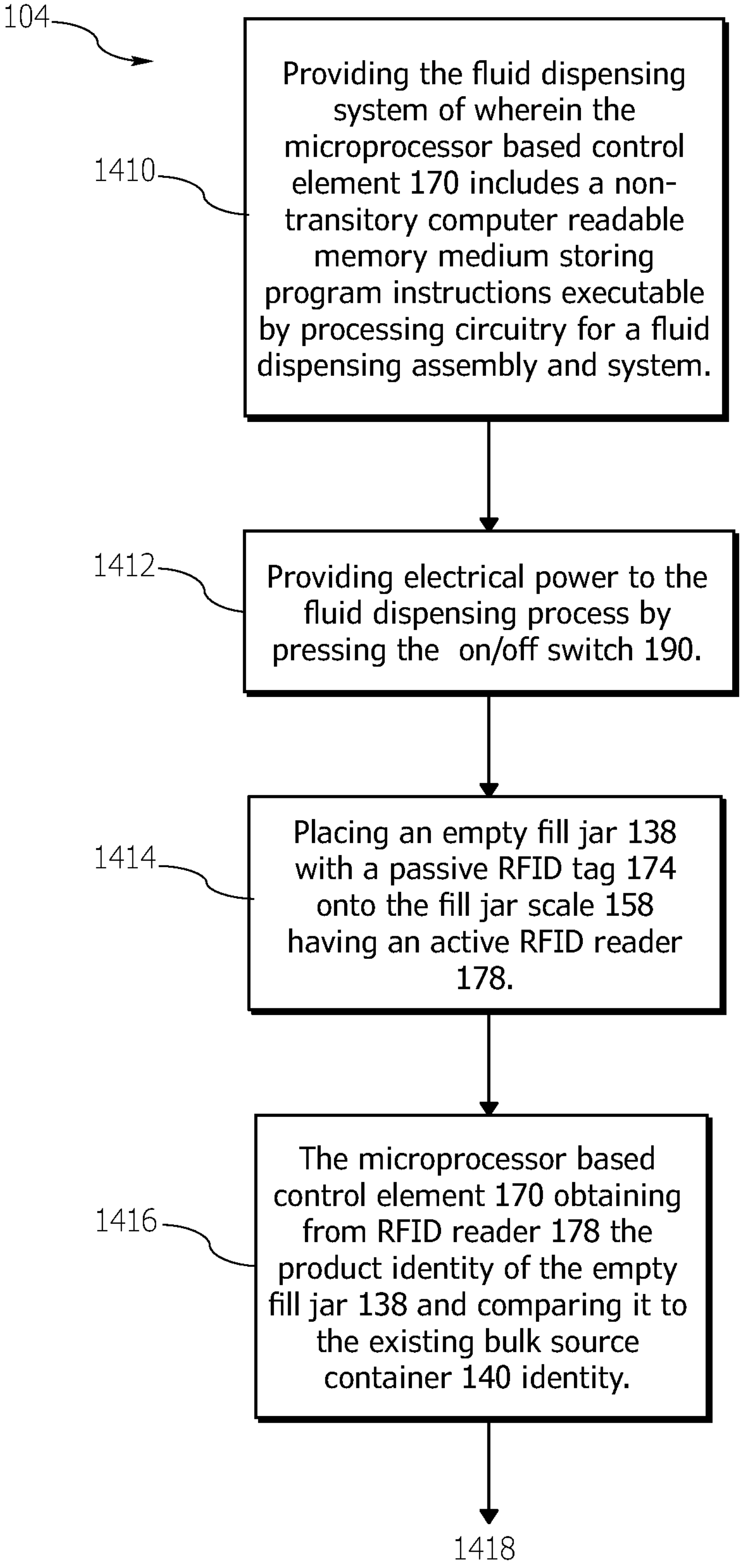
FIG. 19A depicts a portion of the system initialization routine and fill jar initialization routine for an aspect of the filling station method 104.
Figure 19B:
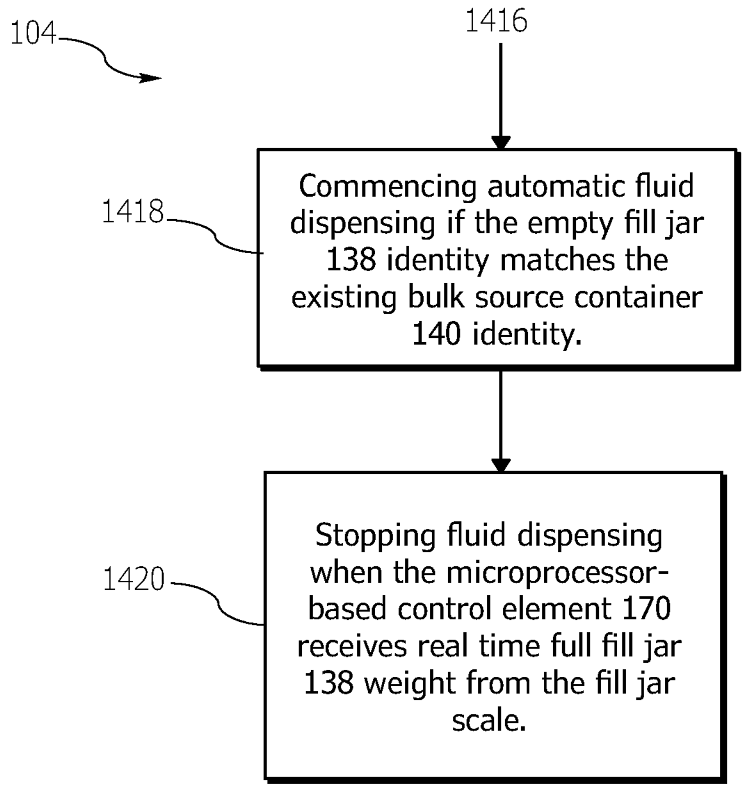
FIG. 19B depicts a portion of the system initialization routine and fill jar initialization routine for an aspect of the filling station method 104.

A fluid dispensing method 104 to selectively refill a jar, the method for fill jar 138 initialization comprising the steps:

A) providing the fluid dispensing system of wherein the microprocessor based control element 170 includes a non-transitory computer readable memory medium storing program instructions executable by processing circuitry for a fluid dispensing assembly and system, 1410, FIG. 19A;

B) providing electrical power to the fluid dispensing process by pressing the on/off switch 190, 1412, FIG. 19A;

C) placing an empty fill jar 138 with an RFID passive tag 174 onto the fill jar scale 158 having an RFID active reader 178, 1414, FIG. 19A;

D) the microprocessor based control element 170 obtaining from RFID active reader 178 the product identity of the empty fill jar 138 and comparing it to the existing bulk source container 140 identity, 1416, FIG. 19A;

E) commencing automatic fluid dispensing if the empty fill jar 138 identity matches the existing bulk source container 140 identity, 1418, FIG. 19B; and F) stopping fluid dispensing when the microprocessor-based control element 170 receives real time full fill jar 138 weight from the fill jar scale 152,1420, FIG. 19B.

Figure 20:
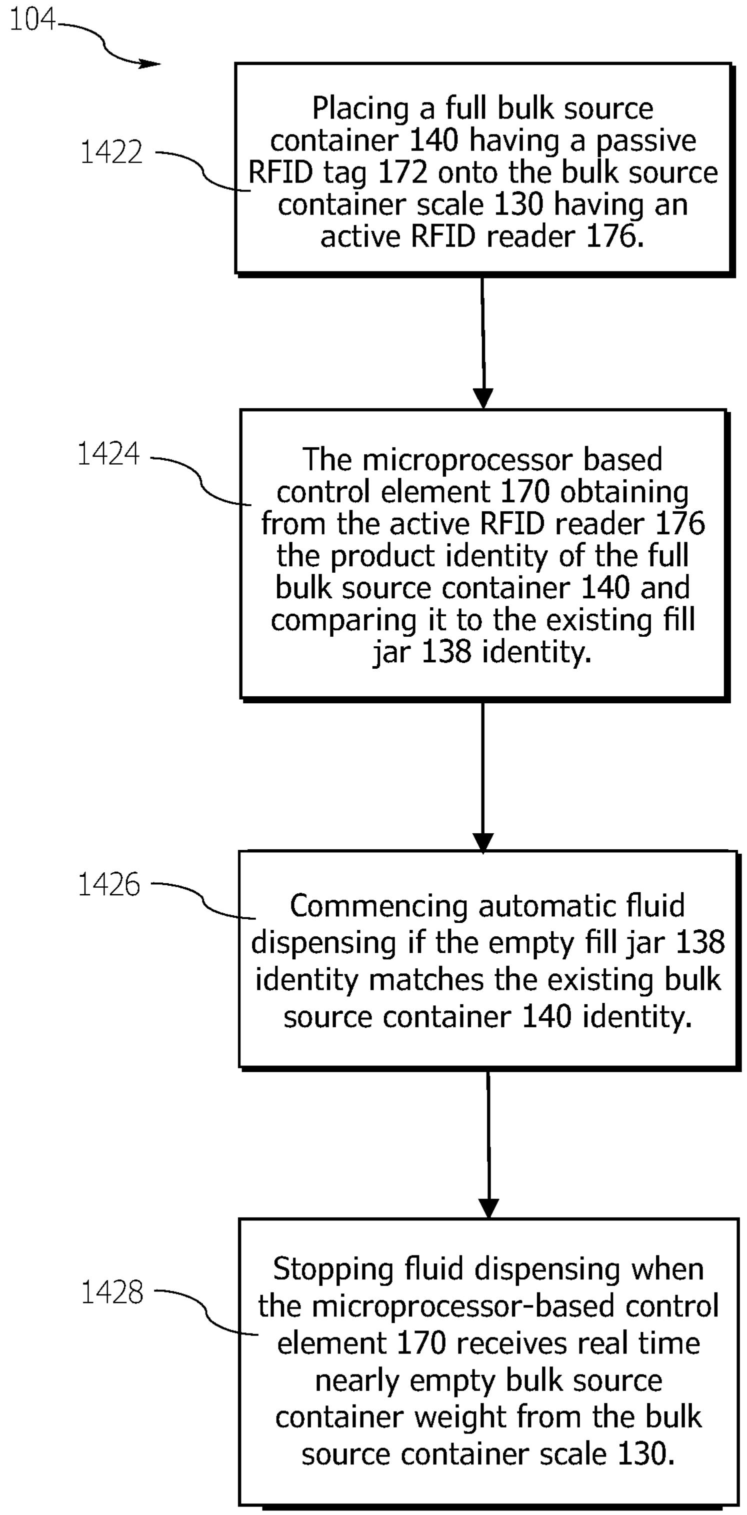
FIG. 20 depicts a bulk source container initialization routine for an aspect of the filling station method 104.

A fluid dispensing method 104 to selectively refill a jar, the initialization methods for the fill jar 138 and bulk source container 140 further comprising the steps:

A) placing a full bulk source container 140 having an RFID passive tag 172 onto the bulk source container scale 130 having an RFID active reader 176, 1422, FIG. 20;

B) the microprocessor based control element 170 obtaining from RFID active reader 176 the product identity of the full bulk source container 140 and comparing it to the existing fill jar 138 identity, 1424, FIG. 20;

C) commencing automatic fluid dispensing if the empty fill jar 138 identity matches the existing bulk source container 140 identity, 1426, FIG. 20; and D) stopping fluid dispensing when the microprocessor-based control element 170 receives real time nearly empty bulk source container weight from the bulk source container scale 130, 1428, FIG. 20.

Figure 21A:
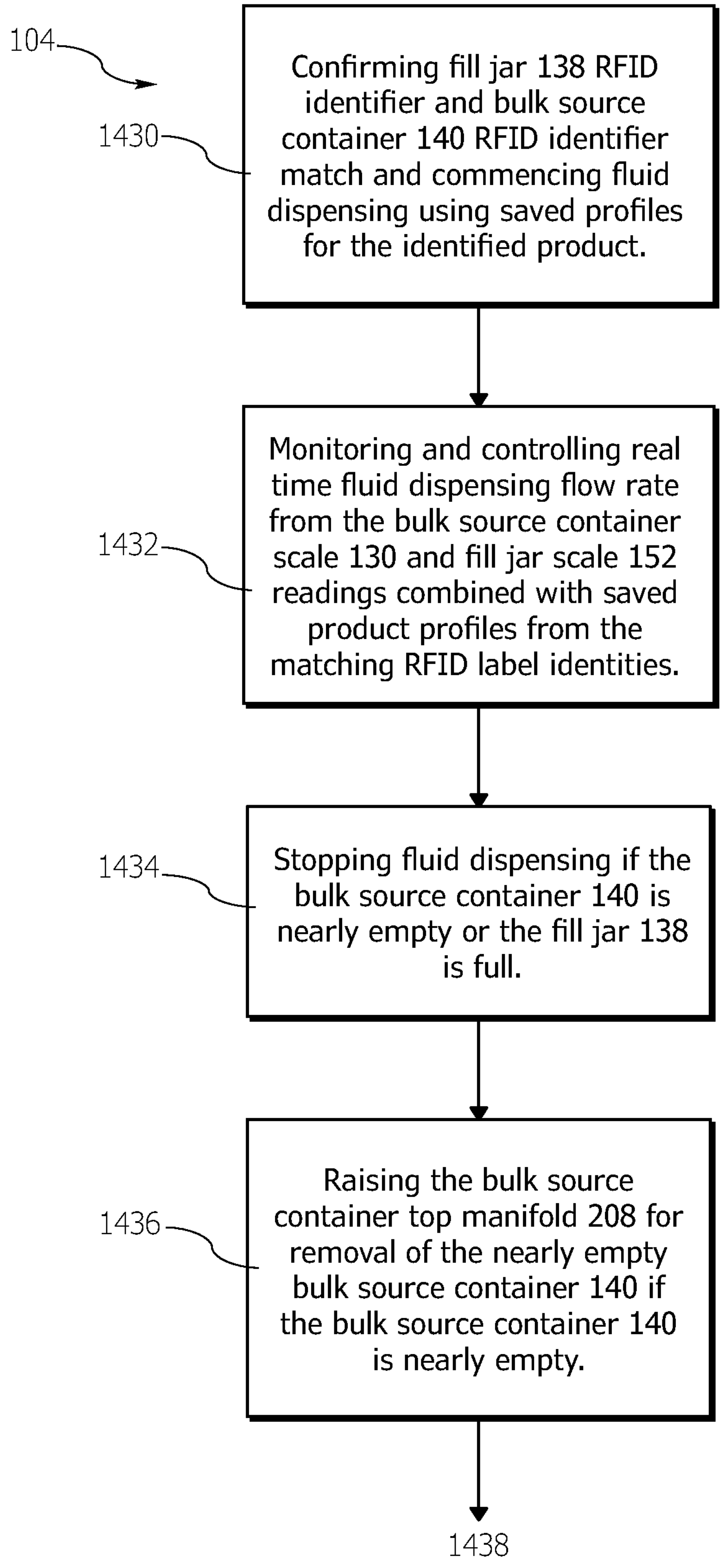
FIG. 21A depicts a portion of the initialization routine for raising the bulk source container tower assembly top manifold and fill jar tower assembly top manifold for an aspect of the filling station method 104.
Figure 21B:
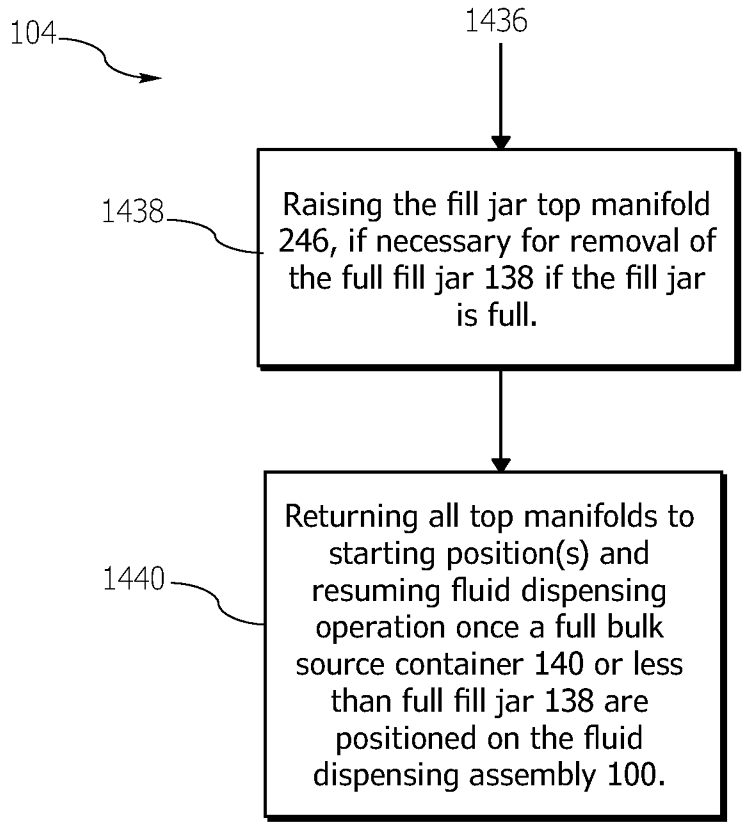
FIG. 21B depicts a portion of the initialization routine for raising the bulk source container tower assembly top manifold and fill jar tower assembly top manifold for an aspect of the filling station method 104.

A fluid dispensing method 104 to selectively refill a jar, the initialization methods for the fill jar 138 and bulk source container 140 further comprising the fill jar 124 tower and bulk source container tower 122 activation steps:

A) confirming fill jar 138 RFID identifier and bulk source container 140 RFID identifier match and commencing fluid dispensing using saved profiles for the identified product; 1430, FIG. 21A;

B) monitoring and controlling real time fluid dispensing flow rate from the bulk source container scale 130 and fill jar scale 152 readings combined with saved product profiles from the matching RFID passive tag identities, 1432, FIG. 21A;

C) stopping fluid dispensing if the bulk source container 140 is nearly empty or the fill jar 138 is full, 1434, FIG. 21A;

D) raising the bulk source container top manifold 208 for removal of the nearly empty bulk source container 140 if the bulk source container 140 is nearly empty, 1436, FIG. 21A;

E) raising the fill jar top manifold 246, if necessary for removal of the full fill jar 138 if the fill jar is full, 1438, FIG. 21B; and F) returning all top manifolds to starting position(s) and resuming fluid dispensing operation once a full bulk source container 140 or less than full fill jar 138 are positioned on the fluid dispensing assembly 100, 1440, FIG. 21B.

Aspects of the fluid dispensing assemblies 100, systems 102, and methods 104 have been described. However, the foregoing aspects have been described at a level of detail to allow one of ordinary skill in the art to make and use the disclosed devices, systems, methods. Wide variation is possible. Components, elements, and/or steps may be altered, added, removed, or rearranged. Additionally, processing steps may be added, removed, or reordered. While certain aspects have been explicitly described, other aspects will also be apparent to those of ordinary skill in the art based on this disclosure.

Some aspects of the fluid dispensing assemblies 100, systems 102, and methods 104 described can advantageously be implemented using, for example, computer software, hardware, firmware, or any combination of software, hardware, and firmware. Software can comprise computer executable code for performing the functions described. In some aspects computer-executable code is executed by one or more general purpose computers. However, a skilled artisan will appreciate, given this disclosure, that any module that can be implemented using software to be executed on a general-purpose computer can also be implemented using a different combination of hardware, software, or firmware. For example, such a module can be implemented completely in hardware using a combination of integrated circuits. Or additionally, such a module can be implemented completely or partially using specialized computers designed to perform the functions described rather than by general purpose computers.

Some aspects of fluid dispensing assemblies 100 and systems 102 provide case assemblies 118, housings 120, scale platforms 132 and 154, top manifolds 208 and 246, cap assemblies 204 and 244, and bottom manifolds 222 and 260 manufactured from 3-D printed or injection molded polycarbonates. Some aspects of fluid dispensing assemblies 100 and systems 102 provide threaded fasteners and connectors constructed from stainless steel for the multiple elements. The number of these threaded fasteners and connectors and the specific details of the same have not been disclosed as these threaded fasteners and connectors and their applicability are well known in the art. However, brass compression fittings 270, FIGS. 6A, 6B, 10, 11, 18A-18C, stainless steel threaded fasteners 274 to attach cap assemblies to tower extruded aluminum central elements and stainless steel threaded fasteners 272 to secure the stepper shaft top ends to their respective manifold assemblies, FIGS. 3, 6A, 6B, and 18A, and polypropylene tubing 278, FIGS. 6A-8 have been disclosed in detail as they are integral to the novel aspects of the fluid dispensing assemblies 100 and systems 102.

While certain aspects have been explicitly described, other aspects will become apparent to those of ordinary skill in the art based on this disclosure. Therefore, the filling station is intended to be defined by reference to the claims published in one or more publications or issued in one or more patents and not simply regarding the explicitly described aspects.

We claim:

1. A fluid dispensing assembly configured to selectively refill a jar, the fluid dispensing assembly comprising:

A) a housing comprising an internal case assembly and supported by a chassis and configured to be positioned on a horizontal support surface;

B) a bulk source container configured to be supported by a bulk source container scale assembly comprising an active radio frequency identification (RFID) reader on the housing and to receive a fluid, the bulk source container comprising an open top and passive RFID tag;

C) a bulk source container tower assembly configured to be supported by the housing, and comprising i) an extruded aluminum central element comprising a longitudinal central axis, open top and bottom ends, and four equal sized channels comprising open top and bottom channel ends and evenly spaced within the extruded aluminum central element around the longitudinal central axis, ii) a cap assembly sized to fit and close the extruded aluminum central element open top end, iii) a top manifold assembly, iv) a bottom manifold assembly fluidly connected to a pumping assembly in the internal case assembly and sized to fit and close the extruded aluminum central element open bottom end including fluid connectivity to any channel housing a tube for fluid flow, v) an external 90 degree bend tube fluidly connected the top manifold assembly and sized to fit within the bulk source container open top to a position above a bulk source container internal bottom surface, vi) a first tube comprising first tube open top and bottom ends and sized to fit within one extruded aluminum cenral element open channel, wherein a bulk source container tower first tube open top end is fluidly connected to the bulk source container tower external 90 degree bend tube in the top manifold assembly, vii) and a second tube comprising a length and diameter equal to the bulk source container tower first tube and second tube open top and bottom ends, wherein the second tube is sized to fit within a bulk source container tower extruded aluminum central element open channel opposite the bulk source container tower extruded aluminum central element open channel housing the bulk source container tower first tube with the second tube open top end attached to the top manifold assembly, and viii) a mechanical assembly affixed to the cap assembly to selectively raise and lower the bulk source container tower manifold assembly and first and second tubes for replacement of a nearly empty bulk source container;

D) a fill jar configured to be supported by a fill jar scale assembly and active RFID reader on the housing and to receive a fluid, the fill jar comprising an open top lip and passive RFID tag;

E) a fill jar tower assembly configured to be supported by the housing, comprising i) an extruded aluminum central element comprising an longitudinal central axis, open top and bottom ends, and four equal sized channels evenly spaced within the central element around the longitudinal central axis, ii) a fill jar cap assembly sized to fit and close the central extruded aluminum element open top end, iii) a top manifold assembly, iv) a bottom manifold assembly fluidly connected to the pumping assembly in the internal case assembly and sized to fit and close the fill jar tower extruded aluminum central element open bottom end including fluid connectivity to any channel housing a tube for fluid flow, v) an external 90 degree fill jar tube fluidly connected to the top manifold assembly and sized to fit within the fill jar at a position below the fill jar opened top lip, vi) a first tube comprising first tube open top and bottom ends and sized to fit within one fill jar tower extruded aluminum central element open channel, wherein a fill jar tower first tube open top end is fluidly connected to the fill jar tower external 90 degree bend tube within the top manifold assembly, vii) and a second tube comprising a length and diameter equal to the first tube and second tube open top and bottom ends, wherein the second tube is sized to fit within an extruded aluminum central element open channel opposite the extruded aluminum central element open channel housing the first tube with the second tube open top end attached to the top manifold assembly, and viii) a mechanical assembly affixed to the fill jar tower top cap assembly to selectively raise and lower the fill jar tower top manifold assembly and first and second tubes for replacement of a full fill jar with an empty fill jar;

F) a microprocessor-based control element within the internal case assembly electronically coupled to i) the pumping assembly, ii) the mechanical assemblies to selectively raise and lower the bulk source tower manifold assembly and the fill jar tower manifold assembly, iii) the bulk source container scale assembly and active RFID reader, iv) the fill jar scale assembly and active RFID reader, and v) a liquid crystal display (LCD) assembly; and G) a power jack configured to adapt an alternating current source of electrical power to a direct current source of electrical power and electrically coupled to the microprocessor-based control element, the pumping assembly, the mechanical assemblies to selectively raise and lower the bulk source container tower top manifold assembly and the fill jar tower top manifold assembly, the bulk source container scale assembly and active RFID reader, the fill jar scale assembly and active RFID reader, and the LCD assembly, for the fluid dispensing assembly to selectively refill the fill jar from the bulk source container.

2. The assembly according to claim 1, wherein the bulk source container tower manifold assembly further comprises a bulk source container tower extrusion bushing, compression fittings stabilizing the a bulk source container tower cap assembly and the bulk source container tower manifold, a bulk source container tower cap assembly mold-in insert, and wherein the mechanical assembly to selectively raise and lower the bulk source container tower manifold assembly comprises a stepper source shaft, a stepper motor, and a sensor fixedly attached to the cap assembly such that a top end of the bulk source container tower stepper source shaft is secured to a bottom surface of the bulk source container tower manifold allowing the bulk source container tower stepper source shaft to move through the bulk source container tower stepper motor in the bulk source container tower cap assembly as the bulk source container tower manifold is raised above the bulk source container tower cap and lowered back upon the bulk source container tower cap.

3. The assembly according to claim 1, wherein the fill jar tower manifold assembly further comprises a fill jar tower extrusion bushing, compression fittings stabilizing the fill jar tower cap assembly and the fill jar tower top manifold, a fill jar tower cap assembly mold-in insert, and wherein the mechanical assembly to selectively raise and lower the fill jar tower top manifold assembly comprises a stepper source shaft, a stepper motor, and a fill jar tower sensor fixedly attached to the fill jar tower cap assembly such that a top end of the fill jar tower stepper source shaft is secured to a bottom surface of the fill jar tower manifold allowing the fill jar tower stepper source shaft to move through the fill jar tower stepper motor in the fill jar tower cap assembly as the fill jar tower manifold is raised above the fill jar tower cap and lowered back upon the fill jar tower cap.

4. The assembly according to claim 1, wherein the bulk source container scale assembly comprises a bulk source container platform, an active RFID reader, and load cell sensors within the housing in proximate location to the bulk source container tower such that an input end of the external 90 degree bend tube affixed to the bulk source container tower top manifold assembly and sized to fit within bulk source container opened top is centered above the bulk source container platform.

5. The assembly according to claim 1, wherein the fill jar scale assembly comprises a fill jar platform, an active RFID reader, and load cell sensors within the housing in proximate location to the fill jar tower such that an output end of the external 90 degree bend tube affixed to the fill jar tower top manifold assembly and sized to fit within the fill jar opened top lip is centered above the fill jar platform.

6. The assembly according to claim 1, wherein the microprocessor-based control element comprises wireless connectivity to an internet and is positioned within the internal case assembly, and the microprocessor-based control element selectively generates a fluid dispensing sequence and selectively turns the pumping assembly on and off based upon real time active RFID reader inputs and real time weight inputs from the bulk source container scale assembly and the fill jar scale assembly.

7. The assembly according to claim 1, wherein the microprocessor-based control element comprises an electronic memory module containing a database pertaining to the bulk source container and the fill jar, the database being retrievable to a remote data server via wireless communication or by direct access through a USB connection port in a wall of the housing.

8. The assembly according to claim 1, wherein the one LCD assembly comprises an interactive display positioned on and coupled to a front wall of the housing wherein the interactive display is configured to be viewed, the display being electronically coupled to the microprocessor-based control element wherein real time fluid dispensing operational parameters and apparatus diagnostics are provided.

9. A fluid dispensing assembly configured to selectively refill a jar, the fluid dispensing assembly comprising:

A) a housing comprising an internal case and supported by a chassis and configured to be positioned on a support surface, the housing further comprising a microprocessor-based control element within the internal case comprising wireless and USB connectivity and electronically coupled within the housing to i) a bulk source container tower, ii) a fill jar tower, iii) a pumping assembly, iv) mechanical assemblies to selectively raise and lower a bulk source container tower manifold assembly and a fill jar tower manifold assembly, v) a bulk source container scale assembly and active radio frequency identification (RFID) reader, vi) a fill jar scale assembly and active RFID reader, and vii) an LCD assembly comprising an interactive display configured to be viewed on a front wall of the housing wherein real time fluid dispensing operational parameters and apparatus diagnostics are on the interactive display;

B) a bulk source container configured to be supported by the bulk source container scale assembly on the housing and to contain a fluid, and comprising an opened top and passive RFID tag;

C) a fill jar configured to be supported by the fill jar scale assembly on the housing and to receive a fluid, and comprising an opened top end lip and passive RFID tag;

D) a bulk source container tower assembly configured to be supported by the housing, and comprising i) a bulk source container tower assembly extruded aluminum central element comprising a longitudinal central axis, open top and bottom ends, and four equal sized channels comprising open top and bottom channel ends and evenly spaced within the extruded aluminum central element around the longitudinal central axis, ii) a bulk source container tower cap assembly sized to fit and close the extruded aluminum central element open top end, iii) a bulk source container tower top manifold assembly, iv) a bulk source container tower bottom manifold assembly fluidly connected to the pumping assembly in the internal case assembly and sized to fit and close the bulk source container tower assembly extruded aluminum central element open bottom end including fluid connectivity to any channel housing a tube for fluid flow, v) an external 90 degree bend tube affixed to the manifold assembly and sized to fit within the bulk source container open top to a position above a bulk source container internal bottom surface, vi) a first tube comprising first tube open top and bottom ends and sized to fit within one extruded aluminum central element open channel, wherein the first tube open top end is fluidly connected to the bulk source container tower external 90 degree bend tube within the top manifold assembly, vii) and a bulk source container tower second tube comprising a length and diameter equal to the bulk source container tower first tube and second tube open top and bottom ends, wherein the bulk source container tower second tube is sized to fit within an extruded aluminum central element open channel opposite the bulk source container tower extruded aluminum central element open channel housing the first tube with the second tube open top end attached to the top manifold assembly, and viii) a mechanical assembly affixed to the bulk source container tower cap assembly to selectively raise and lower the top manifold assembly and first and second tubes for replacement of the bulk source container when the bulk source container is nearly empty;

E) a fill jar tower assembly configured to be supported by the housing, comprising i) an extruded aluminum central element comprising an longitudinal central axis, open top and bottom ends, and four equal sized channels evenly spaced within the central element around the longitudinal central axis, ii) a fill jar tower cap assembly sized to fit and close the extruded aluminum central element open top end, iii) a fill jar tower top manifold assembly, iv) a fill jar tower bottom manifold assembly fluidly connected to the pumping, assembly in the internal case assembly and sized to fit and close the fill, jar tower extruded aluminum central element open bottom end including fluid connectivity to any channel housing a tube for fluid flow, v) an external 90 degree tube affixed to the top manifold assembly and sized to fit within a fill jar opened top to a position below a fill jar opened top lip, vi) a fill jar tower first tube comprising first tube open top and bottom ends and sized to fit within one fill jar tower extruded aluminum central element open channel, wherein a fill jar tower first tube open top end is fluidly connected to the fill jar tower external 90 degree bend tube within the top manifold assembly, vii) and a fill jar tower second tube comprising a length and diameter equal to the fill jar tower first tube and second tube open top and bottom ends, wherein the fill jar tower second tube is sized to fit within a fill jar tower extruded aluminum central element open channel opposite the fill jar tower extruded aluminum central element open channel housing the fill jar tower first tube and second tube top end is attached to the top manifold, and viii) a mechanical assembly affixed to the fill jar tower cap assembly to selectively raise and lower the fill jar tower top manifold assembly for replacement of a full fill jar with an empty fill jar;

F) the bulk source container tower top manifold assembly further comprises a bulk source container tower extrusion bushing, compression fittings stabilizing the bulk source container tower cap assembly and the bulk source container tower top manifold, a bulk source container tower cap assembly mold-in insert, and wherein the mechanical assembly to selectively raise and lower the bulk source container tower top manifold assembly comprises a stepper source shaft, a stepper motor, and a sensor fixedly attached to the bulk source container tower cap assembly such that a top end of the bulk source container tower stepper source shaft is secured to a bottom surface of the top manifold allowing the stepper source shaft to move through the bulk source container tower stepper motor in the cap assembly as the top manifold and first and second tubes are raised above the cap assembly and lowered back upon the cap assembly;

G) the jar tower top manifold assembly further comprises a fill jar tower extrusion bushing, compression fittings stabilizing the fill jar tower cap assembly and the fill jar tower top manifold, a fill jar tower cap assembly mold-in insert, and wherein the mechanical assembly to selectively raise and lower the top manifold assembly comprises a stepper source shaft, a stepper motor, and a sensor fixedly attached to the cap assembly such that a top end of the stepper source shaft is secured to a bottom surface of the top manifold allowing the stepper source shaft to move through the stepper motor in the cap assembly as the top manifold and first and second tubes are raised above the cap assembly and lowered back upon the cap assembly;

H) the bulk source container scale assembly comprises a bulk source container platform, an active RFID reader, and load cell sensors within the housing in proximate location to the bulk source container tower such that an input end of the external 90 degree bend tube affixed to the bulk source container tower top manifold assembly and sized to fit within the at source container opened top is centered above the bulk source container platform;

I) the fill jar scale assembly comprises a fill jar platform, an active RFID reader, and load cell sensors within the housing in proximate location to the at least one fill jar tower such that an output end of the external 90 degree bend tube affixed to the fill jar tower top manifold assembly and sized to fit within the fill jar opened top lip is centered above the fill jar platform;

J) wherein a power jack within the housing is configured to adapt an alternating current source of electrical power to a direct current source of electrical power for the fluid assembly apparatus to selectively refill the fill jar from the bulk source container;

K) wherein the microprocessor-based control element selectively generates a dispensing sequence and selectively turns the pumping assembly on and off based upon real time active RFID reader inputs and real time weight inputs from both the bulk source container scale assembly and the fill jar scale assembly;

L) the microprocessor-based control element comprises an electronic memory module containing a database pertaining to the bulk source container and the fill jar, the database being retrievable to a remote data server via wireless communication or by direct access through a USB connection port in a wall of the housing; and M) wherein the LCD assembly comprises an interactive display positioned on and coupled to a front wall of the housing wherein the interactive display is configured to be viewed, the display being electronically coupled to the microprocessor-based control element wherein real time fluid dispensing operational parameters and apparatus diagnostics are provided.

10. A system to selectively refill a jar, the system comprising:

A) a microprocessor-based control element comprising wireless and USB port connectivity and positioned within a housing case assembly to selectively generate a fluid dispensing sequence and selectively turn a housing based pumping assembly electrically coupled to the microprocessor-based control element on and off based upon real time active RFID reader inputs and real time inputs from a housing based bulk source container scale assembly and a housing based fill jar scale assembly both electrically coupled to the microprocessor-based control element;

B) a bulk source container tower and a fill jar tower within the housing on either side of and fluidly connected to the pumping assembly, whereby each tower is electrically coupled to the microprocessor-based control element and each tower is positioned proximate to its respective scale assembly such that a such that an input end of an external 90 degree bend tube affixed to a bulk source container tower top manifold assembly and sized is centered above a bulk source container positioned on the bulk source container scale assembly and an output end of the external 90 degree bend tube affixed to a fill jar tower top manifold assembly is centered above a fill jar positioned on the fill jar scale assembly;

C) the microprocessor-based control element selectively raising the bulk source container tower top manifold assembly as necessary to remove and replace an empty bulk source container or to flush a fluid system and then lowering the bulk source container tower top manifold assembly back to an operational state for refilling the fill jar;

D) the microprocessor-based control element selectively raising the fill jar tower top manifold assembly as necessary to remove and replace a full fill jar or to flush the fluid system and then lowering the fill jar tower top manifold assembly for refilling an empty fill jar;

E) the microprocessor-based control element comprises an electronic memory module comprising a database pertaining to the bulk source container, the fill jar, and system operations, the database being retrievable to a remote data server via wireless communication or by direct access through a USB connection port in the housing; and F) an LCD assembly comprising an interactive display coupled to a housing front wall wherein the display is configured to be viewed, the display being electronically coupled to the microprocessor-based control element wherein real time fluid dispensing operational parameters and system diagnostics are on the interactive display.

11. A method to selectively refill a jar, the method comprising:

A) providing the fluid dispensing system of claim 10, wherein a microprocessor-based control element comprises a non-transitory computer readable memory medium storing program instructions executable by processing circuitry for a fluid dispensing assembly and system;

B) providing electrical power to the system by activating an on/off switch;

C) placing an empty fill jar comprising a passive RFID tag onto the fill jar scale comprising an active RFID reader;

D) the microprocessor-based control element obtaining from an active RFID reader a product identity of the empty fill jar and comparing it to an existing bulk source container;

E) commencing automatic fluid dispensing if the empty fill jar identity matches the existing bulk source container identity and a real time weight of the bulk source container is greater than nearly empty; and F) stopping fluid dispensing when the microprocessor-based control element receives a real time full weight for the fill jar from the fill jar scale or when the real time weight of the bulk source container from the bulk source container scale is greater than nearly empty.

12. A fluid dispensing method to selectively refill a jar of claim 11, the method further comprising:

A) placing a full bulk source container comprising a passive RFID tag onto the bulk source container scale comprising an active RFID reader;

B) the microprocessor based control element obtaining from the active RFID reader a product identity of a full bulk source container and comparing it to an existing fill jar identity and fill jar weight;

C) commencing automatic fluid dispensing if the existing fill jar identity matches the existing bulk source container identity and the existing fill jar is not full; and D) stopping fluid dispensing when the microprocessor-based control element receives real time bulk source container weight is nearly empty from the bulk source container scale or when the existing fill jar is full.

13. A fluid dispensing method to selectively refill a jar of claim 12, the method further comprising the steps:

A) confirming a fill jar passive RFID tag and a bulk source container passive RFID tag match and commencing fluid dispensing using saved profiles for an identified product;

B) monitoring and controlling real time fluid dispensing flow rate from the bulk source container scale reading and fill jar scale reading combined with saved profiles from the matching passive RFID tag identities;

C) stopping fluid dispensing if the bulk source container is nearly empty or the fill jar is full;

D) raising the bulk source container top manifold for removal of the nearly empty bulk source container if the bulk source container is nearly empty;

E) raising the fill jar top manifold if necessary for removal of the full fill jar if the fill jar is full; and F) returning all top manifolds to an original starting position and resuming fluid dispensing operations once a full bulk source container and a less than full fill jar are positioned on the fluid dispensing assembly.

* * * * *